(12) United States Patent
Heerschap et al.

(10) Patent No.: US 9,851,203 B2
(45) Date of Patent: Dec. 26, 2017

(54) APPARATUS AND METHODS FOR MEASURING STRIKE AND DIP, TREND AND PLUNGE, BEARINGS, AND INCLINATION

(71) Applicant: Real Science Innovations, LLC, Lander, WY (US)

(72) Inventors: Lauren Heerschap, Lander, WY (US); David Heerschap, Lander, WY (US)

(73) Assignee: REAL SCIENCE INNOVATIONS, LLC, Lander, WY (US)

( * ) Notice: Subject to any disclaimer, the term of this patent is extended or adjusted under 35 U.S.C. 154(b) by 171 days.

(21) Appl. No.: 14/752,055

(22) Filed: Jun. 26, 2015

(65) Prior Publication Data
US 2015/0377620 A1  Dec. 31, 2015

Related U.S. Application Data

(60) Provisional application No. 62/018,009, filed on Jun. 27, 2014, provisional application No. 62/183,559, filed on Jun. 23, 2015.

(51) Int. Cl.
*G01C 17/16* (2006.01)

(52) U.S. Cl.
CPC .................... *G01C 17/16* (2013.01)

(58) Field of Classification Search
CPC .............. G01C 17/16; A61B 17/00491; A61B 17/0057; A61B 17/12022; A61B 17/12118; A61B 17/12181
USPC ....................................................... 33/355 R
See application file for complete search history.

(56) References Cited

U.S. PATENT DOCUMENTS

| | | | |
|---|---|---|---|
| 526,021 A | 9/1894 | Brunton | |
| 590,696 A | 9/1897 | Batson | |
| 709,046 A | 9/1902 | Rueger | |
| 725,073 A | 4/1903 | Gouyard | |
| 921,889 A | 5/1909 | Reynolds | |
| 997,222 A * | 7/1911 | Wainwright | ............. G02B 1/00 33/272 |

(Continued)

FOREIGN PATENT DOCUMENTS

| | | |
|---|---|---|
| EP | 0668484 | 8/1995 |
| EP | 2546606 | 1/2013 |

(Continued)

OTHER PUBLICATIONS

U.S. Appl. No. 29/589,113, Dec. 28, 2016, Iden.

(Continued)

*Primary Examiner* — Yaritza Guadalupe-McCall
(74) *Attorney, Agent, or Firm* — Sheridan Ross PC

(57) ABSTRACT

An apparatus and methodology for measuring strike and dip of a plane, trend and plunge of a line, directional bearing in the horizontal plane, and angle of inclination in the vertical plane. More specifically, the present invention relates to a compass adapted to measure geological features using single compass configurations for each type of measurement. The compass includes a base, a hinge assembly rotatably interconnected to the base, and a lid rotatably interconnected to the hinge assembly. The lid is operable to rotate around both a major axis and a minor axis of the compass. A sight tube is positioned in a hollow bore of the hinge assembly and is operable to sight directional bearings.

20 Claims, 18 Drawing Sheets

(56) References Cited

U.S. PATENT DOCUMENTS

| | | | |
|---|---|---|---|
| 1,468,368 A * | 9/1923 | Morgan | G01C 15/00 33/273 |
| 1,474,394 A | 11/1923 | Warburg | |
| 1,571,697 A * | 2/1926 | Bernegau | G01C 17/12 33/273 |
| 1,936,846 A | 11/1933 | Leupold | |
| 1,944,104 A | 1/1934 | Nidermann | |
| 2,019,411 A | 10/1935 | Hassel | |
| 2,027,952 A | 1/1936 | Bandoly | |
| 2,108,263 A | 2/1938 | L'Abee-Lund | |
| 2,111,829 A | 3/1938 | Winterer et al. | |
| 2,141,173 A | 12/1938 | Cordova | |
| 2,358,589 A | 9/1944 | Piffath | |
| 2,487,044 A | 11/1949 | Cude | |
| 2,498,083 A | 2/1950 | Kennedy et al. | |
| 2,680,297 A | 6/1954 | Vaucher | |
| 2,822,618 A | 2/1958 | Wendel | |
| 2,857,679 A | 10/1958 | Le Bleu | |
| 2,878,578 A | 3/1959 | Howard | |
| 2,914,862 A * | 12/1959 | Hendriks | G01C 17/16 33/301 |
| 3,160,961 A | 12/1964 | Linehan | |
| 3,184,854 A | 5/1965 | Grasse | |
| 3,191,306 A * | 6/1965 | Kierans | G01C 17/00 33/273 |
| 3,217,420 A | 11/1965 | Dinsmore | |
| 3,876,313 A | 4/1975 | Messler et al. | |
| 4,020,559 A | 5/1977 | Sherman | |
| 4,081,912 A | 4/1978 | Laney | |
| 4,095,348 A | 6/1978 | Kramer | |
| 4,158,260 A * | 6/1979 | Benger | G01C 17/18 33/272 |
| 4,175,333 A * | 11/1979 | Kramer | G01C 17/10 33/344 |
| 4,395,828 A | 8/1983 | Juhas | |
| 4,438,568 A | 3/1984 | Kramer et al. | |
| 4,622,750 A | 11/1986 | Dudek et al. | |
| D290,093 S * | 6/1987 | Kramer | 33/272 |
| 4,700,490 A * | 10/1987 | Kramer | G01C 17/04 33/345 |
| 4,899,453 A * | 2/1990 | Bhat | G01C 17/04 33/272 |
| 5,086,568 A | 2/1992 | McKeown et al. | |
| D369,982 S | 5/1996 | Chang | |
| 6,094,830 A | 8/2000 | Gloor et al. | |
| 6,145,209 A * | 11/2000 | Chang | G01C 17/24 33/348 |
| 6,357,128 B1 | 3/2002 | Iden | |
| 6,516,526 B1 * | 2/2003 | Iden | G01C 17/10 33/1 E |
| 6,578,277 B1 * | 6/2003 | Chang | G01C 17/24 33/348 |
| 6,647,633 B2 | 11/2003 | Iden | |
| 6,701,631 B1 | 3/2004 | Monteiro et al. | |
| 6,739,063 B2 * | 5/2004 | Chang | G10K 5/00 116/137 R |
| 7,134,213 B1 | 11/2006 | Ashin | |
| 7,331,114 B1 | 2/2008 | Belew | |
| 7,991,441 B2 * | 8/2011 | Kim | H04M 1/0214 455/575.1 |
| 8,296,960 B1 | 10/2012 | Iden | |
| 8,322,041 B1 | 12/2012 | Iden | |
| 8,393,086 B1 * | 3/2013 | Kihm | G01B 3/563 33/341 |
| 8,509,862 B2 * | 8/2013 | Jin | H04M 1/0212 455/550.1 |
| 8,640,351 B2 | 2/2014 | Chang | |
| 8,695,225 B2 * | 4/2014 | Iden | G01C 17/04 33/355 R |
| 8,732,968 B2 * | 5/2014 | Kang | E02D 1/02 33/1 E |
| 9,038,280 B2 * | 5/2015 | Iden | G01C 17/20 33/348 |
| 2003/0110651 A1 * | 6/2003 | Chang | G01C 17/24 33/355 R |
| 2004/0045179 A1 * | 3/2004 | Chang | G10K 5/00 33/355 R |
| 2006/0146030 A1 | 7/2006 | Kim | |
| 2010/0095878 A1 | 4/2010 | Kilgus | |
| 2011/0128511 A1 * | 6/2011 | Ko | G03B 21/30 353/119 |
| 2013/0014397 A1 * | 1/2013 | Iden | G01C 17/20 33/355 R |
| 2013/0014398 A1 * | 1/2013 | Iden | G01C 17/04 33/355 R |
| 2013/0239422 A1 * | 9/2013 | Kang | E02D 1/02 33/354 |
| 2014/0182149 A1 | 7/2014 | Chapman | |
| 2015/0377620 A1 * | 12/2015 | Heerschap | G01C 17/16 33/301 |

FOREIGN PATENT DOCUMENTS

| | | |
|---|---|---|
| GB | 366210 | 2/1932 |
| WO | WO 2013/187584 | 12/2013 |

OTHER PUBLICATIONS

"Axis Transit Instruction Manual," Brunton, 2014, 15 pages.
International Preliminary Report on Patentability for International (PCT) Patent Application No. PCT/US15/37873, dated Dec. 27, 2016 6 pages.
Examination Report for Community Design Application No. 003556109, dated Jan. 12, 2017, 1 page.
"Silva Ranger® CL Compass—Silva Compasses," Johnson Outdoors Gear LLC, © 2013, 2 pages [retrieved from: https://web.archive.org/web/20130914062148/http://store.silvacompass.com/professional-military-ranger-cl].
International Search Report and Written Opinion for International (PCT) Patent Application No. PCT/US15/37873, dated Oct. 13, 2015 8 pages.
"Basic stratum compass GEKOM," F.W. Breithaupt & Sohn GmbH & Co. KG, 2015, 1 page [retrieved from: http://www.breithaupt.de/en/products/magnetic-compasses/geological-compasses/gekom/].
"Geo Transit Operator's Manual," Brunton, © 2001, 17 pages.
"Gimbal," Wikipedia, the free encyclopedia, last modified Apr. 14, 2015, 6 pages [retrieved from: http://en.wikipedia.org/w/index.php?title=Gimbal&oldid=656506107].
"Inclinometer," Wikipedia, the free encyclopedia, last modified May 31, 2015, 6 pages [retrieved from: http://en.wikipedia.org/w/index.php?title=Inclinometer&oldid=664817982].
"Stratum compass COCLA," F.W. Breithaupt & Sohn GmbH & Co. KG, 2006, 1 page [retrieved from: http://www.breithaupt.de/en/products/magnetic-compasses/geological-compasses/cocla/].
"Strike and dip," Wikipedia, the free encyclopedia, last modified Apr. 7, 2015, 3 pages [retrieved from: http://en.wikipedia.org/w/index.php?title=Strike_and_dip&oldid=655348018].
Babaie "The Brunton® Compass and Geological Objects." Georgia State University, Department of Geology, 2001, 8 pages.
Coe "Geological Field Techniques," Blackwell Publishing Ltd., 2010, 337 pages.
Examination Report for European Design Application No. 003556109-0001; dated May 16, 2017 5 pages.

* cited by examiner

APPARATUS AND METHODS FOR MEASURING STRIKE AND DIP, TREND AND PLUNGE, BEARINGS, AND INCLINATION

CROSS-REFERENCE TO RELATED APPLICATIONS

This application claims priority under 35 U.S.C. §119(e) to U.S. Provisional Patent Application Ser. No. 62/018,009 filed Jun. 27, 2014, and U.S. Provisional Patent Application Ser. No. 62/183,559 filed Jun. 23, 2015, which are each incorporated herein in their entirety by reference.

FIELD OF THE INVENTION

Embodiments of the present invention relate generally to a novel magnetic compass and geologic formation measuring device. More particularly, the present invention relates to apparatus and methods for measuring strike and dip of a plane, trend and plunge of a line, directional bearing in a horizontal plane, and angle of inclination in a vertical plane.

BACKGROUND

The measurement, description, and mapping of planes, lines, and angles is foundational to the geological sciences and to many other field-based disciplines. As illustrated in FIG. 1, geological structures 4 and landforms have a three dimensional nature that is measureable in reference to three orthogonal axes: a horizontal reference plane 6 with X- and Y-axes, and a vertical plane, usually referred to as the Z-axis or elevation. The horizontal plane 6 is typically visualized as a level water surface and described as X, Y map coordinates or a compass bearing between two points. The vertical plane is perpendicular to the horizontal plane and running through a line, whether a line of directional bearing between two points or the lineation of a feature being measured. Methods and apparatus used to measure geological structures are described in Coe, Angela. L. (ed.), Geological Field Techniques, Wiley-Blackwell, The Open University, 2010, which is incorporated herein by reference in its entirety.

To measure, record, and map the orientation of a geological structure, such as the bedding plane 4 illustrated in FIG. 1, geoscientists measure the bedding plane in reference to the horizontal reference plane 6, in both the horizontal and vertical planes. Strike 8 is the directional bearing of a line produced by the intersection between a plane substantially parallel to the surface of the geological structure 4 in question and the horizontal plane 6. Strike 8 can have two possible bearings that are 180 degrees from each other. Dip 10 is a vertical angle between the plane parallel to the surface of the bedding plane 4 in question and the horizontal plane 6. Dip 10 consists of an angle and a singular direction, with dip 10 direction 11 always perpendicular to strike 8. Dip direction 11 is often described as a general bearing quadrant. The complete description of a plane consists of strike 8 (bearing), dip (angle) 10, and dip direction 11.

To measure, record, and map the orientation of a line or lineation 12 of a geological structure 4, geoscientists measure the lineation 12 in reference to a vertical reference plane, in both the horizontal and vertical planes. Trend 14 is the directional bearing of the vertical plane that intersects the lineation 12. Trend 14 has a singular direction if the lineation 12 is non-horizontal, with trend pointing in the direction that the lineation plunges down. Plunge 16 is a vertical angle between the lineation 12 and the horizontal plane 6, measured in the vertical plane of trend. Plunge 16 only consists of an angle because trend 14 already states the direction of the lineation 12. The complete description of the lineation 12 consists of trend 14 (bearing) and plunge 16 (angle).

To measure, record, and map a directional bearing between two points, geoscientists measure compass direction or azimuth in the horizontal plane 6. Usually the directional bearing is measured from the point where one is standing to another point in the landscape. Bearing can be stated in azimuth format (0-360 degrees, where 0° is North and 180° is South) or in quadrant format (NW, NE, SE, SW, with angles stated in relation to North or South within relevant quadrants).

To measure, record, and map an angle of inclination between two points, geoscientists measure angles in the vertical plane. This measurement is usually performed from a viewer's eye height with a device that measures angle up or down to an object in the landscape. Zero degrees is a horizontal angle and 90 degrees is a vertical angle.

The measurement of planes, lines, azimuths, and angles in the field is an important skill and methodology for geologists, surveyors, engineers, and workers of other field-based disciplines. For over 100 years, these measurements have primarily been performed using a pocket transit, a small, lightweight tool originally invented by Canadian mining engineer D.W. Brunton in 1894. The pocket transit consists of a magnetic compass with a needle that always seeks magnetic North, a perimeter divided into quadrants (NW, NE, SE, SW) or azimuth (0-360 degrees), a bull's-eye level to ensure accurate compass readings, and an inclinometer mechanism with a protractor dial and inclinometer level to measure angles in the vertical plane. Most models contain a hinged lid to protect the compass face, with a mirror inside the lid cover that is used for sighting in combination with a fold-out sighting arm opposite the lid hinge. The lid can only rotate around one axis formed by a solid pivot pin of the hinge.

Improvements upon the original model continue to be made by the Brunton Company of Riverton, Wyo., including a magnetic needle mounted on a jewel bearing, magnetic damping of the needle to speed up measurements, adjustment for magnetic declination, and a button that locks the magnetic needle for measurement readings and for protection of the assembly when the lid is closed during transport. One Brunton transit model has hinge dials that can be used to measure dip angle while simultaneously measuring dip direction. Brunton pocket transits are oriented with compass North pointing perpendicular and away from to the lid hinge, parallel to the fold-out sighting arm. Many of these features are disclosed in U.S. Pat. Nos. 526,021, 4,095,348, 4,175,333, 4,438,568, 4,700,490, 6,357,128, 6,516,526, 6,647,633, 8,322,041, and U.S. Design Pat. No. 290,093, which are each incorporated herein by reference in their entireties. These pocket transits and prior art compasses have been found to have several deficiencies which limit their usefulness and make taking accurate measurements difficult.

Measuring strike and dip of a plane with prior art compass models can be accomplished by either a direct contact method or a sighting method. Examples of methods of measuring geological structures with a Brunton Geo Transit are illustrated and described in "Brunton, Geo Transit Operator's Manual," and further identified as "11-GEO rev. 0109" (copyright 2001) available at https://cdn.shopify.com/s/files/1/0217/7948/files/Transit Manual.pdf?17230039625499351574 (last visited May 30, 2015), which is incorporated herein by reference in its entirety.

The direct contact method of measuring strike and dip with a Brunton type transit requires at least three separate compass orientations and measurements. First, the bearing 18 of strike 8 is measured by holding the side edge of the compass 20 along the plane of the geological structure 4, as illustrated in FIG. 2. The compass 20 is then leveled and the location of the magnetic needle on the perimeter ring is read to determine the bearing 18 of strike 8. Next, the angle of dip 10 is read by turning the compass 90 degrees and placing its edge on the plane of the geological structure 4, as illustrated in FIG. 3. The inclinometer arm on the back of the compass 20 (not illustrated) is adjusted until the inclinometer bubble level in the compass face is level. The dip angle is then read from the inclinometer dial 22. Finally, dip direction is measured by holding the compass face 21 horizontal again and placing the hinge or lid 24 of the compass 20 against the plane formed by the geological structure 4 with the compass pointing in the direction of dip, as illustrated in FIG. 4. An alternate direct contact method, also illustrated in FIG. 4, is to measure dip angle and dip direction only. Strike may then be calculated because strike is always perpendicular to dip. Several compass models exist that have hinge dials 22 (or hinge inclinometers) that can be used to measure dip angle while dip direction perpendicular to the hinge axis is simultaneously measured with the compass face.

Unfortunately, it is common to make mistakes when measuring strike and dip of a plane as the compass 20 is moved using the direct contact method. Obtaining an accurate strike measurement is further inhibited by uneven bottom surfaces on many prior compass models. These uneven surfaces interfere with leveling of the compass to obtain a strike measurement. The direct contact method is especially problematic when measuring planes of less than 10 degree dip.

The sighting method for measuring strike and dip, illustrated in FIG. 5, is used when direct contact of the compass 20 with the plane being measured cannot be achieved and when a person can move to a position in line-of-sight along the plane's strike. A level line of sight to the plane is found. The directional bearing (strike) is measured along that level line of sight. This requires two steps and compass orientations. Dip angle is measured by holding the compass 20 at arm's length, aligning either a top or bottom edge of the compass with the plane of the geological structure 4, and adjusting the inclinometer arm (not illustrated) and level to read the angle on the inclinometer dial 22. Dip direction is estimated or calculated based upon strike and measured dip angle. Measuring strike and dip from a distance requires at least four separate compass orientations.

Measuring trend and plunge of a lineation with known compass models (not illustrated) can also involve a direct contact method or sighting method. The contact method of measuring trend and plunge requires two different compass orientations and a second object. This method is one of the most challenging to visualize, understand, and teach, and leads to many errors when lineations are on near-vertical or overhanging faces. The direct contact method is best performed by measuring plunge angle first. The compass is set on one of its edges along the lineation. The clinometer arm and level are then used to quantify plunge angle. Next, trend is measured. A second object, such as a non-metallic clipboard or notebook, is often required to help create a vertical plane that is measureable. The second object is placed directly along the lineation, and the compass edge is held flush against the object or aligned with the object. When the bull's-eye level on the compass face is level, the second object is vertical, and the bearing in the direction of downplunge can be measured (trend).

Measuring trend and plunge using the sighting method requires that a person can place himself in line-of-sight along the trend of the lineation and then move to place himself perpendicular to the lineation to measure plunge. Because it is difficult, and sometimes not possible, to be perpendicular to the lineation, measuring plunge using the sighting method is rarely used. A directional bearing of trend can be measured with a level compass face, then a sighted measurement of plunge angle can be measured by aligning the compass edge at arm's length along the lineation. Measuring trend and plunge using the sighting method requires two different compass orientations, and as stated above, is rarely used due to inaccuracy.

The traditional method of measuring a directional bearing of an object 29 with a known compass 20 can be performed at either waist height or eye height. The waist height method of measuring a directional bearing 18, illustrated in FIG. 6, involves holding the compass 20 away from metallic belt buckles at approximately waist height. The user then looks down on the compass face 21 and sights the object 29 in question by using a mirror 27 positioned in the compass lid 24 and a fold-out sighting arm 28. The simultaneous requirements of finding the object's reflection 29A upside-down in the mirror 27, aligning the object 29 with the sighting arm 28, leveling the compass face 21 with a bull's-eye level, and reading the compass needle are challenging to even the seasoned professional.

The eye height method of measuring a directional bearing 18, illustrated in FIG. 7 involves turning the compass 180 degrees so that the lid 24 is positioned away from the user, bringing the fold-out sighting arm 28 close to the user's eye, and arranging the lid 24 so the compass face 21 is visible to the user in the mirror 27. An object is sighted through an aperture 25 (illustrated in FIG. 8) in the mirror 27 and lid 24 or through a small sight 26 attached to the lid 24. The user must then level the compass 20 and read a reflection of the compass needle in the mirror 27. This method is also quite challenging and open to error, since the opposite end of the magnetic compass needle needs to be read.

Measuring a vertical angle with known compasses is performed at eye height by holding the compass 20 on edge, as illustrated in FIG. 8. The fold-out sighting arm 28 is placed near the user's eye, the mirror in the lid 24 is arranged so that the inclinometer bubble level and dial are visible reflected in the mirror, and the object is sighted through peep hole or aperture 25 formed through the lid 24 and the mirror 27. The user adjusts the clinometer arm on the back of the compass 20 until a bubble level in the compass face 21 is level. The angle is then read as a reflection of an inclination dial 22 (shown in FIG. 5) in the mirror 27 of the lid 24. Alternatively, the user can read the angle by moving the compass 20 away from the user's eye and looking at the inclination dial on the compass face 21. While a straightforward method, certain lighting situations make it very difficult to see the inclinometer bubble level.

Known compasses present many challenges which can lead to improper use of the tool or inaccurate measurements. Users learning to use known compasses are often frustrated by the multi-step, awkward processes involved. Many of the measurements using traditional compasses are not intuitive or easily visualized. Measurements must be carefully recorded in the field, and significant error is introduced when either multiple steps and compass orientations are involved, or when the compass is put away or placed on the ground between measurements to allow for recording. Even seasoned professionals encounter situations where traditional compasses are almost impossible to use or read.

Several attempts have been made to improve the design of compasses and geologic formation measuring devices. One example is U.S. Pat. No. 1,468,368, which describes a telescope pivotally secured to a cover of surveying instrument. Other examples are U.S. Pat. Nos. 1,944,104 and 4,020,559 which describe sight openings formed through a housing of the compass. Another example is U.S. Pat. No. 6,701,631, which describes a compass adapted to measure direction and dip with or without assistance of the earth's magnetic field. Yet another example is provided in U.S. Pat. No. 8,393,086, which describes an apparatus for measuring trend and plunge and includes a rod operable to be disposed parallel to a lineation. Still another design, described in U.S. Patent Publication No. 2013/0239422, includes a compass in a measuring unit pivotably mounted to a support piece. Each of these Patents and Patent Publications are incorporated herein by reference in their entirety.

Various other prior art compasses, components of compasses, and devices for measuring geologic structures have been described. Examples are provided in U.S. Pat. Nos. 709,046, 725,073 921,889, 997,222, 1,468,368, 1,474,394, 1,571,697, 1,936,846, 2,019,411, 2,027,952, 2,108,263, 2,111,829, 2,141,173, 2,358,589, 2,487,044, 2,498,083, 2,680,297, 2,822,618, 2,857,679, 2,878,578, 2,914,862, 3,160,961, 3,184,854, 3,191,306, 3,217,420, 3,876,313, 4,081,912, 4,158,260, 4,395,828, 4,622,750, 6,094,830, 6,145,209, 6,701,631, 6,739,063, 7,134,213, 7,331,114, 8,296,960, 8,322,041, 8,393,086, 8,640,351, 8,695,225, U.S. Patent Application Publication No. 2003/0110651, U.S. Patent Application Publication No. 2013/0014397, U.S. Patent Application Publication No. 2013/0014398, U.S. Patent Application Publication No. 2013/0239422, U.S. Patent Application Publication No. 20140182149, U.S. Design Pat. 369,982, U.K. Pat. No. GB 366210, World Intellectual Property Organization Publication WO 2013/187584, European Patent Application Publication No. 0668484, and European Patent Application Publication No. 2546606, which are each incorporated herein by reference in their entirety. The compasses and surveying devices described by these patents do not solve the problems of known compasses described above.

These designs fail to teach or describe various novel features of the compass of the present invention. Furthermore, many previous attempts to improve the design of known compasses have involved major changes to the design of the compass, or added additional elements to the compass, increasing the size and complexity of the compass and making the compass more easily damaged in the field. Accordingly, there is an unmet need for a more intuitive compass that requires fewer steps for each type of measurement.

SUMMARY OF THE INVENTION

Based on the unmet need for a compass that is easy to use, the present invention provides an apparatus and methods of taking measurements of strike and dip, trend and plunge, bearing, and angle in an effective, reliable manner. The apparatus of the current invention is markedly different from any other known compass designs and enables easier, more intuitive and accurate measurements.

One aspect of the present invention is to provide a compass with a unique North orientation. In one embodiment, a North orientation of the compass is parallel to a major axis through a hollow hinge of the compass. Thus, when the compass is aligned with North pointing away from the user, the hinge is on the left side of the face of the compass.

Another aspect of the present invention is to provide a novel hinge interconnecting the compass base and the lid. In one embodiment of the present invention, the hinge is operable to rotate the lid of the compass about both a major axis and a minor axis of the compass. The major hinge axis is parallel to a North-South line of the compass face and the minor axis is parallel to an East-West line of the compass face. The hinge can be locked to prevent unintended or inadvertent rotation or movement of the lid about the minor axis and, optionally, about the major axis.

Yet another aspect of the present invention is a novel protractor dial. The protractor dial includes a graduated scale that is adapted to measure plunge. In one embodiment of the present invention, the protractor dial is positioned on an exterior surface portion of the compass lid. In another embodiment the protractor dial is positioned on a portion of the hinge assembly.

Still another aspect of the present invention is a hollow hinge that enables sighting of objects through the hollow hinge. In one embodiment, a sight tube is positioned in the hollow hinge. The sight tube includes one or more removable lenses forming a telescope adapted to magnify an object viewed through the sight tube by the user. A variety of lenses with different magnification levels may be interchangeably used with the sight tube. Additional lenses with or without magnification may be provided with cross hairs and stadia lines of different scales as will be appreciated by one of skill in the art. The user can select lenses with a desired magnification level, or a combination of lenses that provide the desired magnification level, and install the lenses in the sight tube in the field. If no magnification is necessary, the user can remove the lenses from the sight tube. In another embodiment, lenses with stadia lines are provided proximate to each end of the sight tube.

It is another aspect of the present invention to provide graduated clinometer dials on at least one end of the hinge assembly of the geologic compass. The clinometer dials may be positioned concentric with the sight tube and enable the angle between the cover and the compass body to be accurately measured. Accordingly, the clinometer dials allow dip angle to be measured simultaneously with the strike bearing on the compass face. Dip direction can be noted while the compass is still in position. In one embodiment, one clinometer dial is provided on one end of the hinge assembly. In another embodiment, graduated clinometer dials are provided on each end of the hinge assembly.

Another aspect of the present invention is to provide methods of taking measurements of strike and dip, trend and plunge, bearing, and angle each with the compass in one configuration. Said another way, the compass of the present invention may be placed in one configuration that can be used to provide a variety of measurements to describe a geological structure of interest instead of two or more different configurations required for the same measurements required by prior art compass models.

Still another aspect of the present invention is to provide a geologic compass with an electronic display. The electronic display is operable to indicate when the base piece of the compass is level and to display a magnetic bearing and a dip angle of a clinometer of the geologic compass. The dip angle may be measured by the clinometer positioned in the base piece, a first clinometer dial proximate to a first end of the hinge assembly, or a second clinometer dial proximate to a second end of the hinge assembly. The electronic display may optionally display an angle of the base piece with respect to a horizontal plane. In one embodiment, the electronic display is operable to present a digital display of magnetic compass readings and inclinations, for example, by using Arabic numerals. In another embodiment, the electronic display is operable to display a specific angle of rotation of a lid piece of the geologic compass around a major axis of the geologic compass. In yet another embodiment, the electronic display is operable to display a specific angle of rotation of a lid piece of the geologic compass around a minor axis of the geologic compass. In still another embodiment of the present invention, the electronic display can display a direction of trend of a lineation based on an orientation of the lid piece with respect to the compass base. Accordingly, when a first portion of the lid piece is rotated above the compass base, the electronic display will display a magnetic bearing of the lineation associated with the North end of the compass needle. When the first portion of the lid piece is rotated below the compass base, the electronic display will display a magnetic bearing of the lineation associated with the South end of the compass needle. In another embodiment, the electronic display is operable to display a plunge angle indicated by a protractor dial of the geologic compass. In one embodiment, the electronic display is a liquid crystal display. In another embodiment, the electronic display comprises light emitting diodes.

In one embodiment, a compass is provided. The compass includes a base generally comprising a magnetic compass and a clinometer. The magnetic compass includes a needle, a graduated dial, and a compass rose. The clinometer comprises a gravity-driven clinometer needle with a graduated clinometer dial. In one embodiment of the present invention, the clinometer needle and magnetic compass needle are coaxial. A needle lock is operable to either lock or unlock both the magnetic needle and the clinometer needle. The compass dial is rotatable to adjust for declination. In one embodiment of the present invention, a declination adjustment mechanism is provided to rotate the compass dial. In another embodiment, the compass dial can be rotated by a user's fingers. The compass base includes one or more levels in various positions. In one embodiment, a bull's-eye level is provided on a face portion of the base. In another embodiment, a first bubble level is positioned in a left side surface of the base and a second bubble level is positioned in a right side surface of the base.

The compass further includes a hinge assembly interconnected to a portion of the base. The hinge assembly generally comprises a body with a cylindrical bore. In one embodiment of the present invention, the hinge assembly includes an extension. The extension is adapted to be retainably received in a portion of the compass base. In one embodiment, a hinge receptacle is formed in the compass base to receive the extension. In another embodiment, the extension projects substantially perpendicular from the body of the hinge assembly. In another embodiment of the present invention, the compass base includes an extension that is adapted to rotatably interconnect the hinge assembly to the compass base.

The compass includes a hinge lock is to selectively prevent movement of the lid around a minor axis of the compass. In one embodiment, the hinge lock is operable to apply a force to an extension of the hinge assembly. In another embodiment, flat surfaces are formed on the extension. The flat surfaces of the extension are operable to receive the force from the hinge lock to prevent rotation of the extension of the hinge assembly within the hinge box. It will be appreciated by one of skill in the art that other features may be formed on the hinge assembly and the extension to secure the hinge in a predetermined position. In another embodiment, the hinge assembly is adapted to frictionally remain in a predetermined position with respect to the compass base. For example, one or more detents may be provided between the compass base and the hinge assembly to provide a predetermined amount of friction to prevent unintended movement of the hinge assembly. In this manner, the user can adjust or position the hinge assembly in a predetermined orientation with respect to the compass base without manipulating a hinge lock actuator.

The compass further includes a lid piece generally comprising a substantially flat body, two projections extending from the body, and bores formed through the projections. The compass also includes a hollow sight tube. The sight tube is positioned through the bores of the lid projections and through the cylindrical bore of the hinge assembly to rotatably interconnect the lid piece to the base. The hinge assembly is operable to rotate the lid piece around both the major axis and the minor axis of the compass. The hollow sight tube is operable for use to sight objects. In one embodiment, a lid lock is adapted to retain the lid in a predetermined orientation with respect to the major axis of the compass. In another embodiment, the lid is adapted to frictionally remain in the predetermined orientation and may be rotated around the major axis by a rotational force applied by the user.

The compass further comprises a first clinometer dial and a second clinometer dial positioned around the circumference of the sight tube. The first and second clinometer dials are operable to measure dip. In one embodiment, a protractor dial operable to measure plunge is positioned on an exterior surface of the lid. In another embodiment, a protractor dial operable to measure plunge is positioned on at least one portion of the hinge assembly.

In one embodiment, the major axis of the compass is substantially parallel to the cylindrical bore of the hinge assembly. The minor axis is substantially perpendicular to the major axis. A North-South orientation of the compass dial is parallel to the major axis. In another embodiment, the hinge assembly and a distal end of the lid piece are substantially straight without projections and are operable to be placed in contact with a lineation or plane being measured.

Another aspect of the present invention is to provide a device for measuring geologic structures. The device includes, but is not limited to: (1) a base piece comprising a compass; (2) a hinge assembly interconnected to the base piece; and (3) a lid piece rotatably interconnected the hinge assembly, wherein the lid piece is operable to rotate around both a major axis and a minor axis of the base piece.

The device may further include a clinometer positioned in the base piece, the clinometer comprising a clinometer needle and a clinometer dial. The device may also include at least one of a first clinometer dial and a second clinometer dial on the lid piece proximate to first and second ends of the hinge assembly. The first and second clinometer dials and the clinometer positioned in the base piece are operable to measure dip angle. First and second indicia may be formed on each of a left edge portion and a right edge portion of the base piece. The first indicia is operable to indicate a dip angle on the first clinometer dial and the second indicia is operable to indicate a dip angle on the second clinometer dial. The first and second clinometer dials identify an angle of rotation of the lid piece around the major axis.

The device may further include a protractor dial operable to measure plunge angle. A plunge angle is identified on the protractor dial by a portion of the base piece of the device proximate to the protractor dial. In one embodiment, the protractor dial is positioned on an exterior surface portion of the lid piece. In another embodiment, the protractor dial is positioned on at least one portion of the hinge assembly proximate to the base piece.

The device may also include a bore formed through the hinge assembly substantially parallel to the major axis. The bore is operable to sight objects. The device may further include a sight tube positioned in the bore of the hinge assembly. The sight tube is operable to rotate around the minor axis by rotating the hinge assembly around the minor axis. A lens may be positioned in the bore of the hinge assembly. The lens comprises a predetermined magnification. Optionally, in one embodiment of the present invention, the lens may be positioned in the sight tube.

In one embodiment of the present invention, a North-South orientation of the compass of the device is substantially parallel to the major axis and the minor axis is substantially perpendicular to the major axis. In another embodiment, the North-South orientation of the compass can be aligned substantially parallel to the minor axis. In yet another embodiment of the present invention, the compass is rotatably retained in the base piece. Accordingly, the compass may be rotated 360° within the base piece. Position indications are provided to align the compass in one or more pre-determined orientations. In one embodiment, the position indications are detents positioned approximately every 90° between the compass and the base piece.

In still another embodiment, all exterior surfaces of the device of the present invention are substantially linear without projections and are operable to be placed in contact with a lineation or a plane being measured. In another embodiment, a hinge lock and a needle lock are provided. Another aspect of the present invention is a method of manufacturing the device for measuring geologic structures described above.

Another aspect of the present invention is to provide geologic structure measuring device. The device generally includes, but is not limited to: (1) a base piece comprising a magnetic compass and a clinometer; (2) a hinge assembly operably engaged to the base piece, the hinge assembly comprising a body with a bore forming a sight tube through the hinge assembly, the sight tube operable to align the base piece with an object; and (3) a lid piece rotatably interconnected to the hinge assembly, wherein the lid piece is operable to rotate around a major axis of the compass. A lens of a predetermined magnification may be positioned in the sight tube. In one embodiment, the device further comprises a protractor dial. A plunge angle is identified on the protractor dial by a portion of the base piece. In one embodiment, the protractor dial is positioned on an exterior surface of the lid piece. In another embodiment, the protractor dial is positioned on a substantially flat portion of the hinge assembly proximate to the base piece. In one embodiment, a hinge lock and a needle lock are provided.

In another embodiment of the present invention, the device also includes at least one of a first clinometer dial positioned around a circumference of a first end of the sight tube and a second clinometer dial positioned around a circumference of a second end of the sight tube. The first and second clinometer dials are oriented to measure dip angle.

In another embodiment of the present invention, the hinge assembly is rotatably interconnected to the base piece. The lid piece is operable to rotate around both the major axis and a minor axis that is substantially perpendicular to the major axis.

In still another embodiment, a first indicia positioned on the hinge assembly. The first indicia is associated with a North pointer of a needle of the magnetic compass and indicates when the North pointer of the compass needle should be read to measure a bearing. In yet another embodiment, a second indicia is positioned on the hinge assembly. The second indicia is associated with a South pointer of the needle of the magnetic compass and indicates when the South pointer of the compass needle should be read to measure a bearing.

In yet another embodiment of the present invention, the magnetic compass is rotatably interconnected to the base piece. Accordingly, the compass may be rotated 360° within the base piece. In one embodiment, the magnetic compass may be rotated by the user's hand without any tools. In another embodiment, a lock is provided to prevent unintended rotation of the magnetic compass with respect to the base piece. In still another embodiment, detents are positioned approximately every 90° between the compass and the base piece to provide orientation indications.

In another embodiment, the device includes an electronic display. The electronic display is operable to display one or more of a bearing of the magnetic compass, an inclination of the clinometer, the first clinometer dial, and the second clinometer dial, and a plunge angle of the protractor dial. Yet another aspect of the present invention is a method of manufacturing the geologic structure measuring device described above.

Still another aspect of the present invention is to provide a method of measuring trend and plunge of a lineation of a geologic structure. The method generally includes, but is not limited to: (1) providing a device having a base piece with a compass, a hinge assembly rotatably interconnected to the base piece, and a lid piece rotatably interconnected to the hinge assembly; (2) rotating the lid piece around a major axis of the hinge assembly; (3) aligning a portion of the device with the geologic lineation; and (4) leveling the base piece of the device by rotating the base piece around a minor axis of the hinge assembly. The method may further include using a North pointer of a needle of the magnetic compass to determine trend bearing when a first indicia of the hinge assembly is visible. The method may also include using a South pointer of the needle of the magnetic compass to determine trend bearing when a second indicia of the hinge assembly is visible.

In one embodiment of the method of the present invention, aligning a portion of the device with the geologic lineation comprises one of positioning a distal edge of the lid piece substantially parallel with a trend bearing of the geologic lineation and aligning the hinge assembly with the geologic lineation.

In another embodiment of the present invention, the device may further include one or more of: (1) a clinometer positioned in the base piece, the clinometer comprising a clinometer needle and a clinometer dial; (2) a first clinometer dial on the lid piece proximate to a first end of the hinge assembly; (3) a second clinometer dial on the lid piece proximate to a second end of the hinge assembly; (4) first and second indicia on each of a left edge portion and a right edge portion of the base piece, the first indicia operable to indicate a dip angle on the first clinometer dial, and the second indicia operable to indicate a dip angle on the second clinometer dial; (5) a protractor dial operable to measure plunge angle on one or more of the exterior portion of the lid and a flat portion of the hinge assembly; (6) a bore formed through the hinge assembly substantially parallel to the major axis, the bore operable for sighting objects; (7) a sight tube positioned in the bore of the hinge assembly, wherein the sight tube is operable to rotate around the minor axis; (8) a lens positioned in one of the bore of the hinge assembly and the sight tube positioned in the bore; (9) an electronic display operable to display one or more of a bearing of the magnetic compass, an inclination of the clinometer, an inclination of the first or the second clinometer dials, and a plunge angle of the protractor dial; (10) a hinge lock; and (11) a needle lock. Still another aspect of the present invention is a method of manufacturing the device described above.

It is another aspect of the present invention to provide a method of measuring a bearing and a vertical angle of an object with a compass of an embodiment of the present invention. This includes, but is not limited to a method generally comprising: (1) moving the compass to a position within a line-of sight of the object being measured; (2) leveling a base of the compass using one or more levels of the compass; (3) sighting the object through a hollow sighting tube positioned in a hinge assembly of the compass; (4) locking a compass needle of the compass by activating a needle lock to prevent further movement of the compass needle; and (5) recording the bearing or strike of the object indicated by the compass needle on a compass dial scale in the compass base. Optionally, the method may further comprise: (6) moving a lid of the compass to align with an angle of the object; and (7) recording an angle of dip indicated on a clinometer dial at an end of the hollow sighting tube. In one embodiment, activating the needle lock comprises pressing a needle lock actuator to lock the compass needle and releasing the button to allow the compass needle to move freely. In another embodiment, activating the needle lock comprises releasing the needle lock actuator to enable the compass needle to move freely and then pressing the needle lock actuator to lock the needle in place.

Still another aspect of the present invention to provide a method of measuring an angle of inclination of an object with a compass of an embodiment of the present invention. This includes, but is not limited to, a method generally comprising: (1) moving the compass to a position within a line-of sight of the object being measured; (2) sighting the object through a hollow sighting tube of a hinge assembly of the compass; and (3) recording the angle of inclination indicated by one of a protractor dial positioned on an exterior surface of the lid and a plumb needle on a clinometer dial in the face of the compass.

In one embodiment, the method may further include: (1) before sighting the object, rotating a face of the dial to a substantially vertical position; (2) after sighting the object, pressing a needle lock actuator to prevent inadvertent or unintended movement of the plumb needle; and (3) recording the angle of inclination of the object indicated by the plumb needle on the clinometer dial in the face of the compass. In one embodiment of the present invention, the needle lock is biased to an engaged position to prevent movement of the compass needle and the plumb need of the clinometer. To release the needle lock of this embodiment of the present invention, the needle lock actuator is pressed inward. In still another embodiment, the method may further include: (1) before sighting the object, rotating the lid of the compass around a major axis of the compass to position the lid approximately 90° relative to a base of the compass; (2) leveling the compass base using one or more levels of the compass; (3) while sighting the object, rotating the lid of the compass around a minor axis that is substantially perpendicular to the major axis while keeping the face of the compass substantially horizontal; and (4) recording the angle of inclination of the object indicated on the protractor dial where a face of the compass intersects a protractor dial scale positioned on an exterior surface of the compass lid.

Yet another aspect of the present invention is to provide a direct contact method of measuring the strike and dip of a plane using a compass of an embodiment of the present invention with the compass positioned in only one configuration. This includes, but is not limited to, a method generally comprising: (1) aligning a major axis of the compass with strike; (2) placing one of a hinge assembly and a lid of the compass in contact with the plane being measured; (3) leveling a face of the compass with one or more levels of the compass; (4) recording a bearing of strike indicated by a compass needle on a graduated compass dial scale positioned in the compass base; and (5) recording an angle of dip indicated on a clinometer dial at either end of a hollow sighting tube positioned in the hinge assembly. Optionally, the method may further comprise engaging a needle lock mechanism to prevent inadvertent or unintended movement of the compass needle. The needle lock is engaged by one of pressing and releasing a lock actuator. The method may further comprise: before placing the lid or the hinge assembly in contact with the plane being measured, rotating the hinge assembly around a minor axis perpendicular to the major axis; and locking the hinge assembly to prevent movement of hinge assembly.

Yet another aspect of the present invention is to provide a sighting method of measuring strike and dip of a plane with a compass of an embodiment of the present invention. This includes, but is not limited to, a method generally comprising: (1) moving the compass to a position within a line-of sight of a plane being measured; (2) leveling a base of the compass using one or more levels in the base of the compass; (3) sighting through a hollow sighting tube of a hinge assembly of the compass; (4) engaging a needle lock mechanism to prevent inadvertent or unintended movement of a compass needle; (5) recording a bearing of strike indicated by the compass needle on a compass dial scale in the compass base; (6) rotating a lid of the compass around the major axis until the lid is substantially aligned with the plane being measured; and (7) recording an angle of dip indicated on a clinometer dial at either end of the hollow sighting tube. Optionally, the method may include: (8) rotating the compass base to a substantially vertical position; (9) aligning a lower edge of the base substantially parallel to the plane being measured; and (10) recording the angle of dip indicated by a clinometer plumb needle on a clinometer dial in the face of the compass base.

Still another aspect of the present invention is to provide a direct contact method of measuring trend and plunge of a lineation using a compass of the present invention with the compass in one compass configuration. This includes, but is not limited to, a method generally comprising: (1) rotating a lid of the compass around a major axis of the compass to position the lid approximately 90° relative to a base of the compass; (2) placing a distal edge of the lid parallel with a trend bearing of a lineation; (3) unlocking a hinge lock to enable rotation of the hinge assembly around a minor axis that is substantially perpendicular to the major axis; (4) rotating the base of the compass around the minor axis until a face of the compass is substantially horizontal; (5) recording the trend (or bearing) of the lineation indicated by a compass needle on a compass dial in the base; and (6) recording the plunge of the lineation from a protractor dial positioned on an exterior surface of the compass lid, wherein the plunge is indicated where the face of the compass base intersects the protractor dial scale. In one embodiment, indicia are formed on an exterior portion of a hinge assembly adapted to indicate one of the North end and the South end of the magnetic needle to use to measure the trend of the lineation. In one embodiment, the indicia include the letter "N" and the letter "S." In another embodiment, the indicia include different colors that correspond to different colors at a North end and a South end of the compass needle.

Yet another aspect of the present invention is to provide a sighting method of measuring trend and plunge of a lineation with a compass of the present invention. The method generally includes, but is not limited to: (1) moving the compass to a position within a line-of sight of a lineation being measured; (2) leveling a base of the compass using one or more levels in various positions of the compass base; (3) sighting the lineation through a hollow sighting tube associated with a hinge assembly of the compass; (4) recording a directional bearing (or trend) of the lineation indicated by a compass needle on a compass dial scale in the compass base; (5) moving the compass to align an edge of the compass base with the lineation; and (6) measuring the plunge of the lineation in a vertical plane.

The Summary of the Invention is neither intended nor should it be construed as being representative of the full extent and scope of the present invention. The present invention is set forth in various levels of detail in the Summary of the Invention as well as in the attached drawings and the Detailed Description of the Invention. No limitation as to the scope of the present invention is intended by either the inclusion or non-inclusion of elements or components. Additional aspects of the present invention will become more readily apparent from the Detailed Description, particularly when taken together with the drawings.

The above-described embodiments, objectives, and configurations are neither complete nor exhaustive. As will be appreciated, other embodiments of the invention are possible using, alone or in combination, one or more of the features set forth above or described in detail below.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

The terms "geological compass," "pocket transit," and "compass" as used herein refer to any device adapted to measure strike and dip of a plane, trend and plunge of a line, directional bearing in a horizontal plane, and angle of inclination in a vertical plane.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

BRIEF DESCRIPTION OF THE DRAWINGS

The accompanying drawings, which are incorporated in and constitute a part of the specification, illustrate embodiments of the invention and together with the Summary of the Invention given above and the Detailed Description of the drawings given below, serve to explain the principles of these embodiments. In certain instances, details that are not necessary for an understanding of the invention or that render other details difficult to perceive may have been omitted. It should be understood, of course, that the invention is not necessarily limited to the particular embodiments illustrated herein. Additionally, it should be understood that the drawings are not necessarily to scale.

Figure 1:
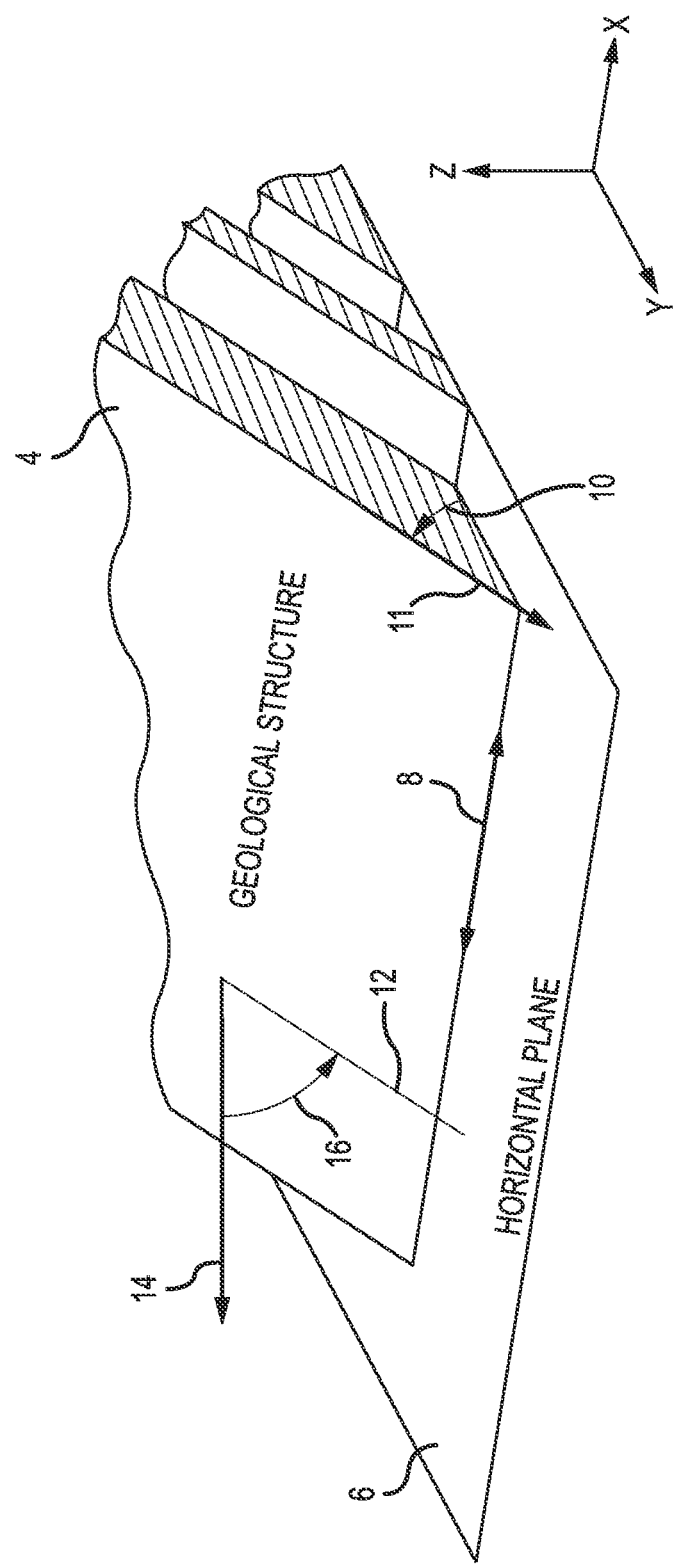
FIG. 1 is a schematic representation of a geological structure.
Figure 2:
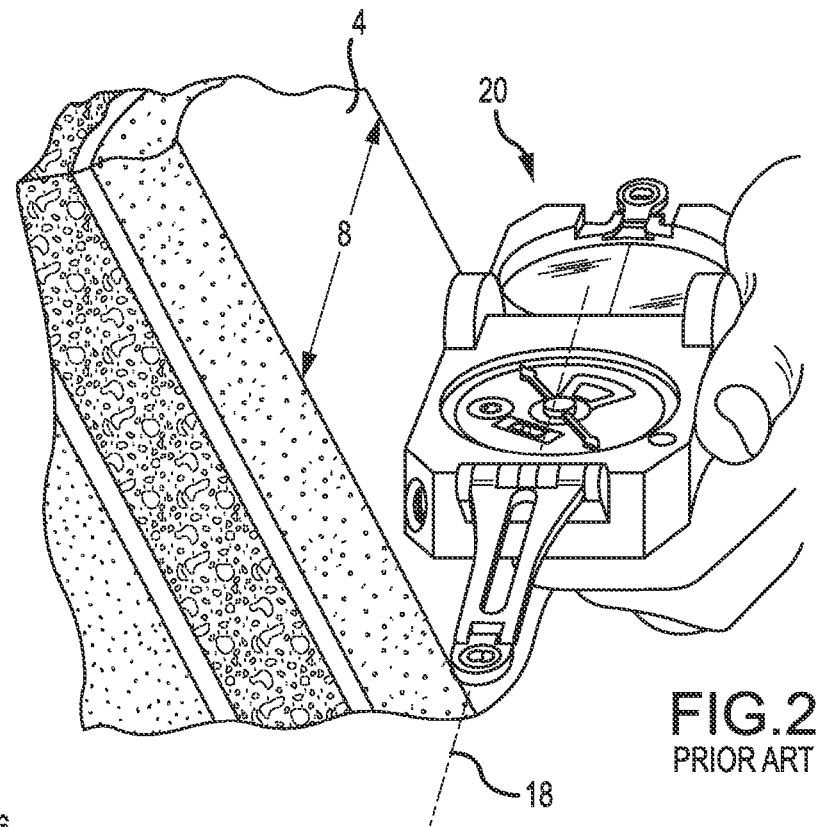
FIGS. 2-4 illustrate a direct contact method of using a known compass to measure strike and dip of a plane formed by a geological structure of interest.
Figure 3:
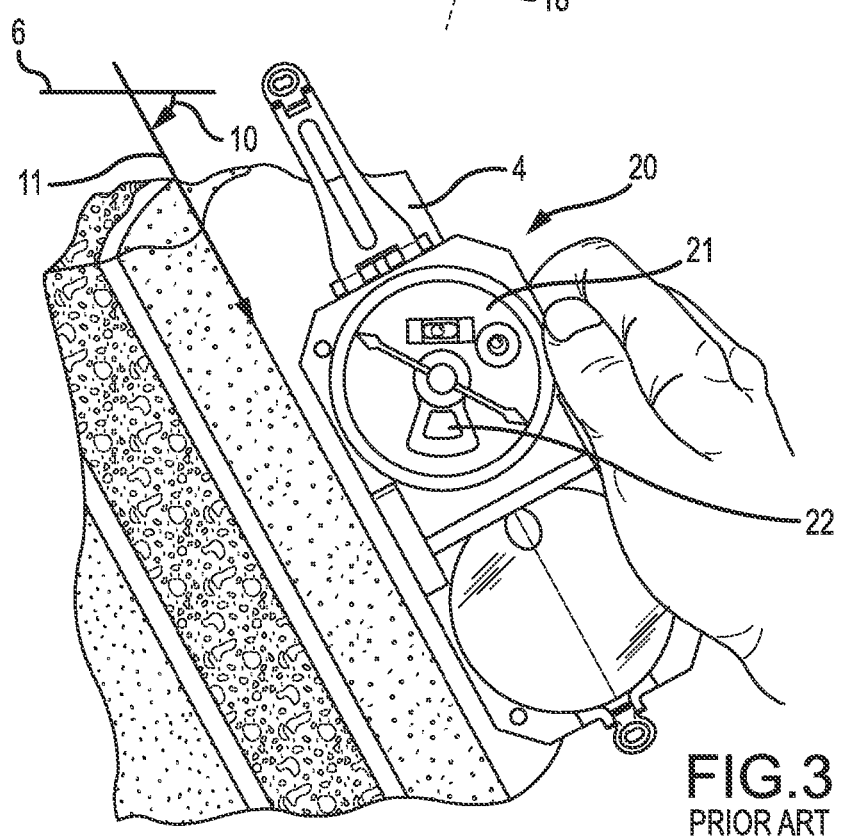
Figure 4:
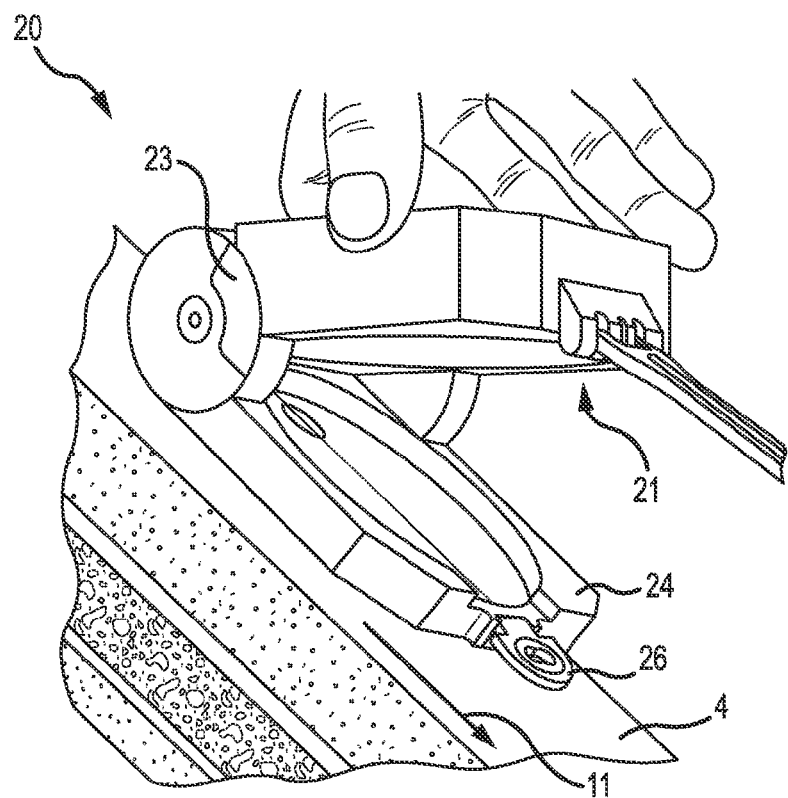
Figure 5:
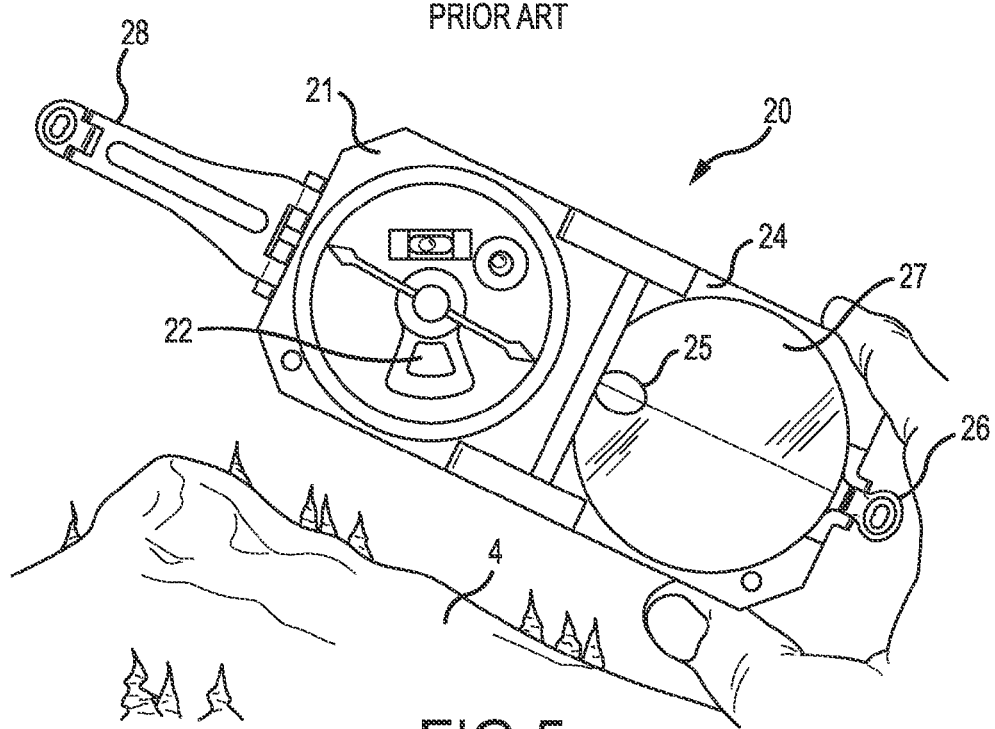
FIG. 5 illustrates a sighting method of measuring dip angle of a geological structure with a known compass.
Figure 6:
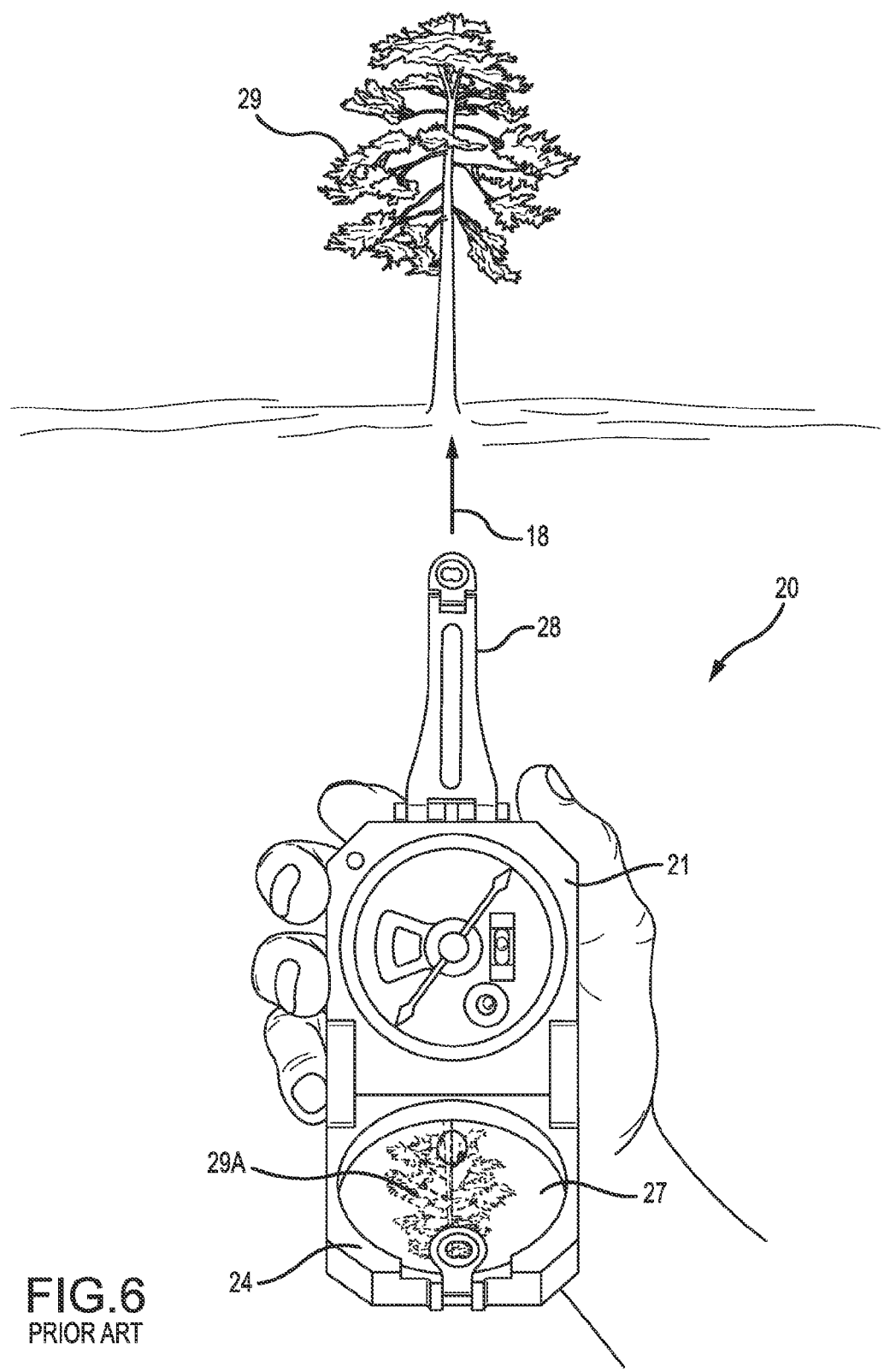
FIGS. 6-7 illustrate methods of measuring a directional bearing of an object with a known compass.
Figure 7:
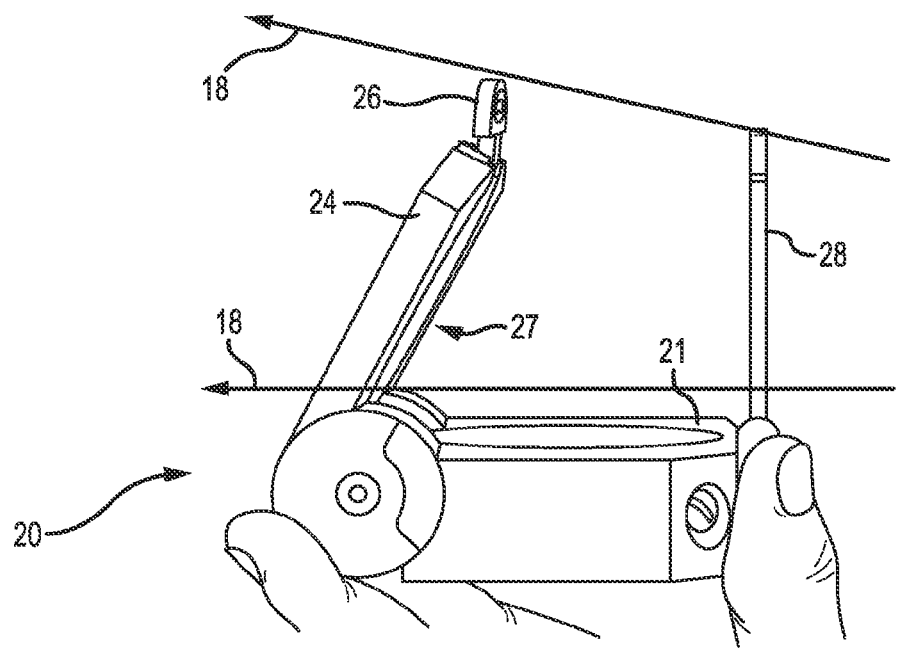
Figure 8:
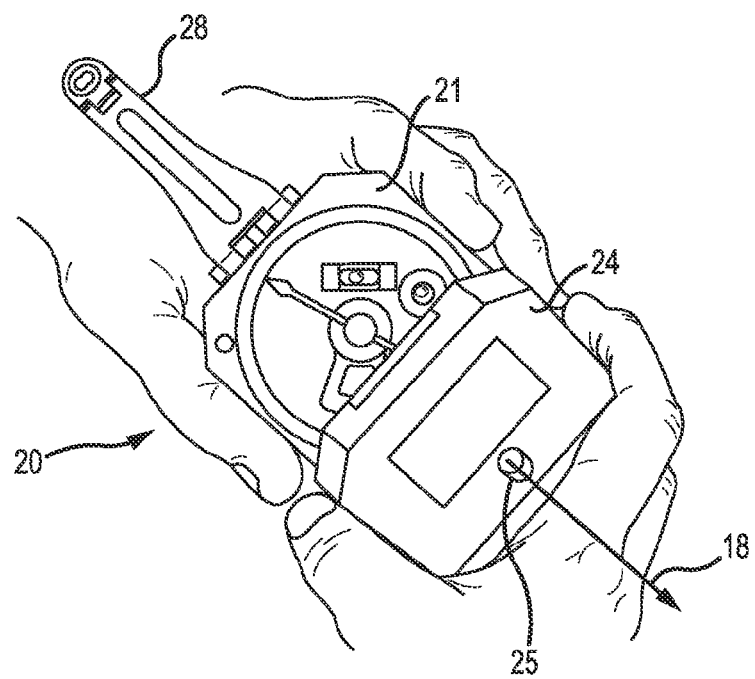
FIG. 8 illustrates a method of using a known compass to measure a vertical angle.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

To assist in the understanding of an embodiment of the present invention, the following list of components and associated numbering found in the drawings is provided herein:

| Number | Component |
|---|---|
| 4 | Geological structure |
| 6 | Horizontal plane |
| 8 | Strike |
| 10 | Dip angle |
| 11 | Dip direction |
| 12 | Lineation |
| 14 | Trend |
| 16 | Plunge |
| 18 | Bearing |
| 20 | Compass |
| 21 | Compass face |
| 22 | Inclinometer dial |
| 23 | Hinge dial |

-continued

| Number | Component |
|---|---|
| 24 | Lid |
| 25 | Aperture |
| 26 | Sight |
| 27 | Mirror |
| 28 | Sighting arm |
| 29 | Sighted object |
| 30 | Geologic compass |
| 32 | Base piece |
| 34 | Lid |
| 36 | Hinge assembly |
| 37 | Hinge top edge |
| 38 | Sighting tube |
| 40 | Major axis |
| 41 | Minor axis |
| 42 | Top edge portion |
| 43 | Bottom edge portion |
| 44 | Left edge portion |
| 45 | Right edge portion |
| 46 | Back portion |
| 47 | Angled edge portion |
| 48 | Lid exterior surface portion |
| 50 | Protractor dial |
| 51 | First protractor scale |
| 52 | Second protractor scale |
| 53 | First lid projection |
| 54 | First bore |
| 55 | Second lid projection |
| 56 | Second bore |
| 58 | First clinometer dial |
| 59 | First measure line |
| 60 | Second clinometer dial |
| 61 | Second measure line |
| 63 | Removable plate |
| 64 | Fastener |
| 65 | Level |
| 66 | Declination adjustment mechanism |
| 67 | Declination lock |
| 68 | Hinge lock actuator |
| 69 | Actuator housing |
| 70 | Base face portion |
| 71 | Magnetic compass |
| 72 | Transparent cover |
| 74 | Graduated dial |
| 75 | Position mark |
| 76 | Post |
| 78 | Compass needle |
| 79 | North pointer |
| 80 | South pointer |
| 82 | Compass rose |
| 83 | North |
| 84 | East |
| 85 | West |
| 86 | South |
| 87 | Needle lock mechanism |
| 88 | Needle lock actuator |
| 90 | Clinometer |
| 92 | Clinometer needle |
| 94 | Clinometer dial |
| 95 | Bull's-eye level |
| 96 | Lid distal end |
| 97 | Lid interior surface portion |
| 98 | Lid concavity |
| 100 | North indicia |
| 102 | South indicia |
| 103 | Flat portion of hinge assembly |
| 104 | Hinge assembly extension |
| 106 | Flange of extension |
| 108 | Catch portion of extension |
| 110 | Hinge assembly bore |
| 111 | Hinge assembly length |
| 112 | Hinge receptacle |
| 114 | Recess |
| 116 | Hinge lock |
| 118 | Lock screw |
| 119 | Aperture |
| 120 | Distal end of lock screw |

DETAILED DESCRIPTION

The present invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, may be modified in numerous ways within the scope and spirit of the invention.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

As previously described, an example of a geological structure 4 is illustrated in FIG. 1. FIGS. 2-8 illustrate prior art methods of using a known compass 20 to measure the features of a geological structure such as the geological structure 4 of FIG. 1.

Figure 9:
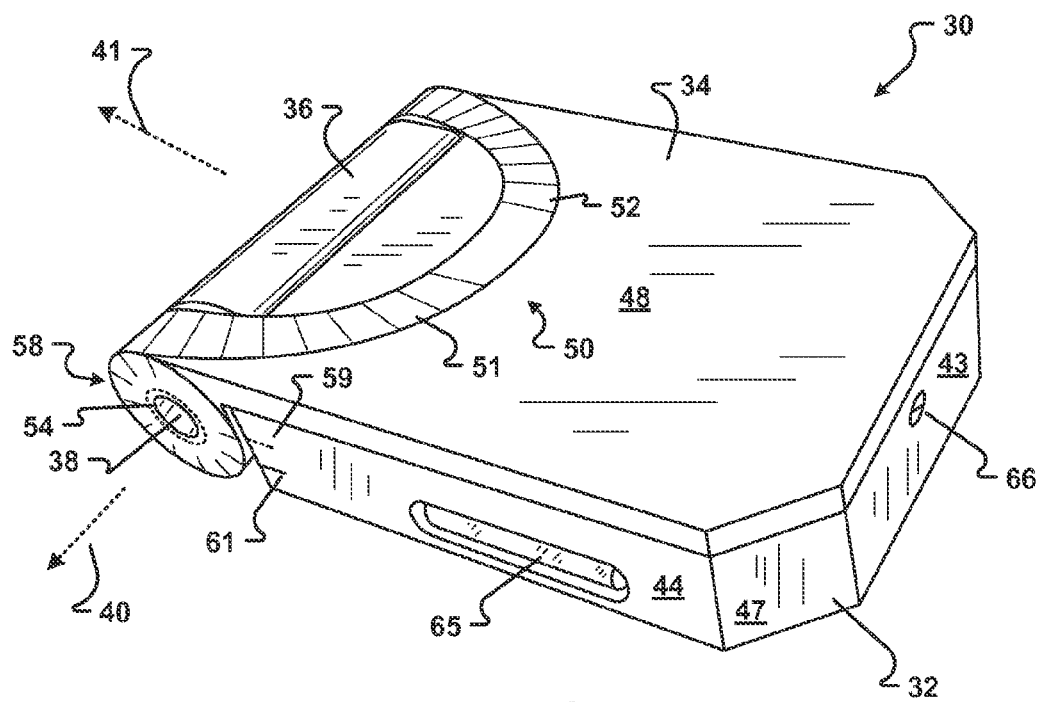
FIG. 9 is a perspective view of geologic compass according to one embodiment of the present invention with a lid positioned in a closed configuration and illustrating a protractor dial of an embodiment of the present invention positioned on an exterior surface portion of the lid and a first side of a hollow sight tube positioned through a rotatable hinge of the compass.
Figure 10:
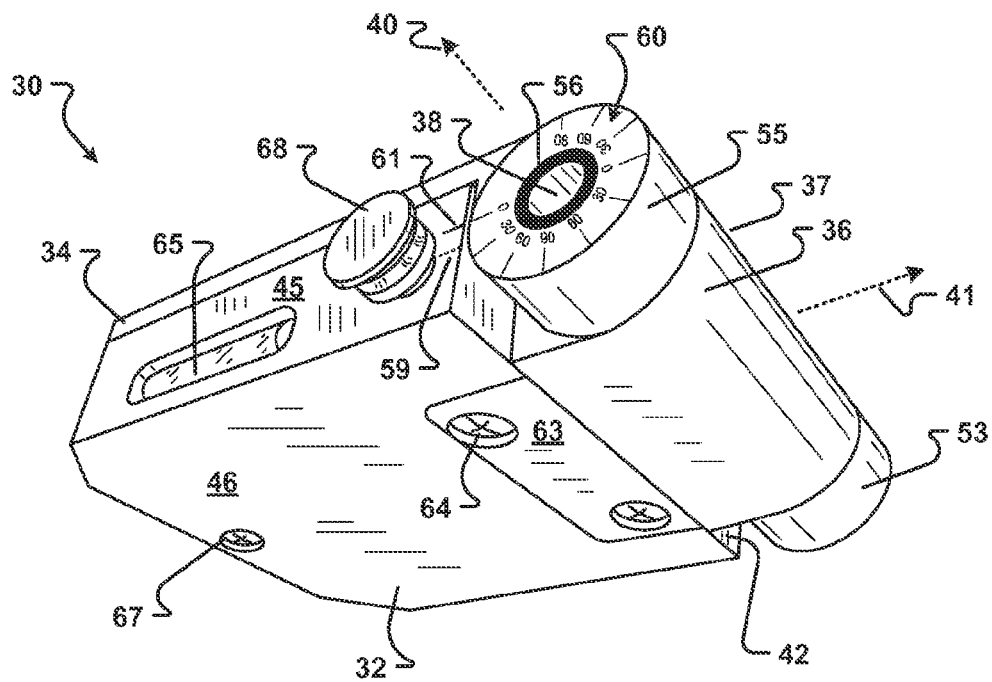
FIG. 10 is another perspective view of the geologic compass of FIG. 9 in the closed configuration and illustrating a bottom surface portion of a base of the compass and a second side of the sight tube.
Figure 11:
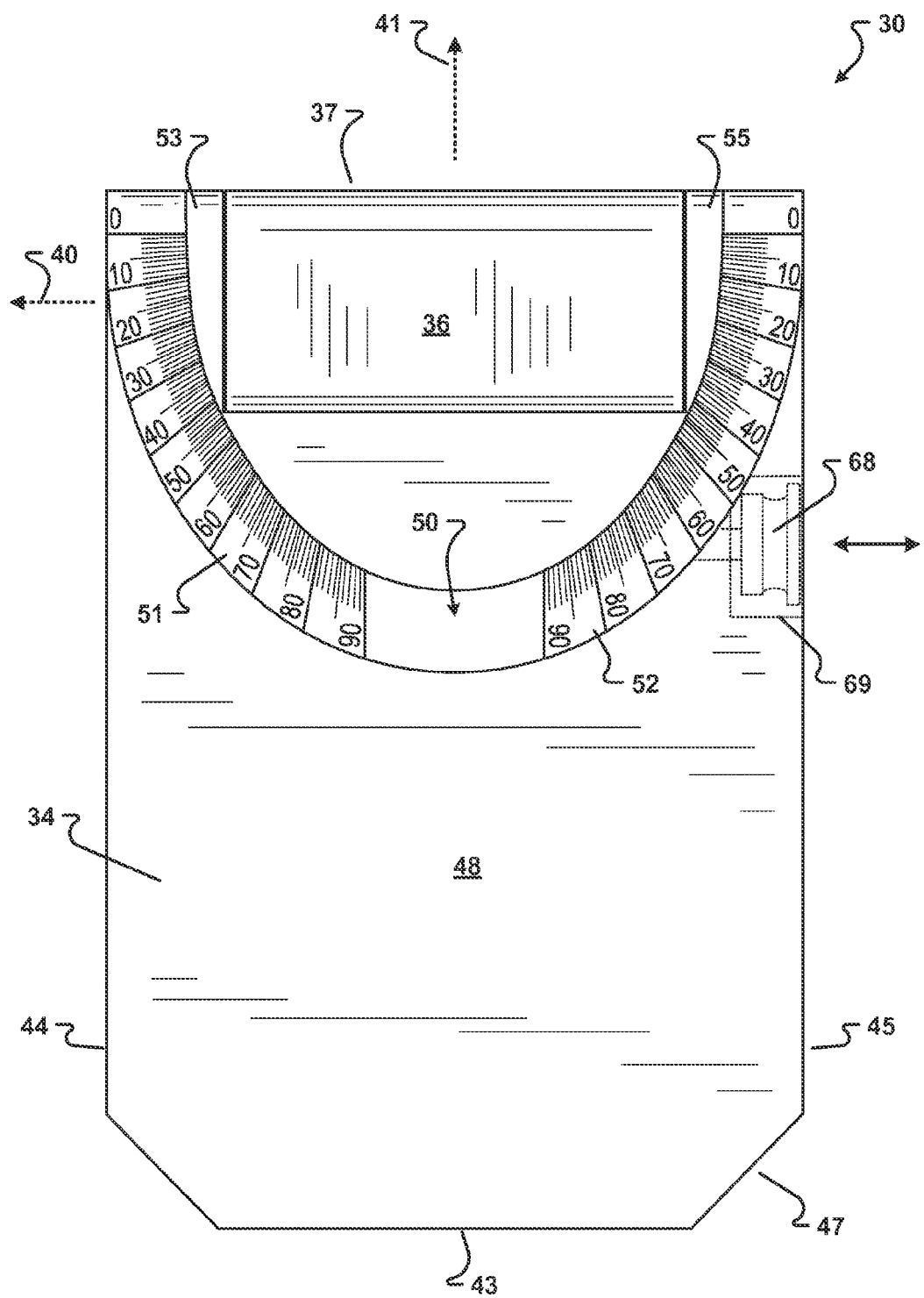
FIG. 11 is a top plan view of the geologic compass of FIG. 9 in the closed configuration and illustrating one embodiment of the protractor dial positioned on the exterior surface portion of the compass lid.

Referring now to FIGS. 9-11, an embodiment of a geologic compass 30 of the present invention is illustrated in a closed configuration. The compass 30 generally comprises a lid 34 pivotally and rotatably interconnected to a base piece 32 by a hinge assembly 36.

The base piece 32 includes a top edge portion 42 proximate to the hinge assembly 36, a bottom edge portion 43, a left edge portion 44, and a right edge portion 45. In one embodiment of the present invention, the top edge portion 42 and the bottom edge portion 43 are in planes that are substantially parallel. In another embodiment of the present invention, the left edge portion 44 and the right edge portion 45 of the base piece 32 form planes that are substantially parallel to each other and substantially perpendicular to the top and bottom edge portions 42, 43. A major axis 40 of the compass is substantially parallel to the top and bottom edge portions 42, 43. The left and right edge portions 44, 45 are substantially parallel to a minor axis 41 of the compass that is substantially perpendicular to the major axis 40.

Levels 65 are provided in various locations of the base piece 32. In one embodiment of the present invention, the levels 65 are positioned in both the left and right edge portions 44, 45. The levels 65 are operable to indicate when the base piece 32 is substantially horizontal. In one embodiment of the present invention, the levels are vial or spirit levels with a generally cylindrical shape. However, as will be appreciated by one of skill in the art, any type of level may be used with the compass 30 of the present invention. For example, levels 65 having different shapes, sizes, and with or without graduation scales, including levels with electric displays, may be used with the compass of the present invention. In another embodiment of the present invention, the compass includes a level with an electronic display that visually indicates an angle of the base piece 32 with respect to a horizontal plane. The visual indication may include any combination of numbers, letters, and symbols. A level 65 may also be positioned in the bottom edge portion 43 of the base piece 32. One or more levels may also be positioned on the compass back portion 46 to help the user level the base when the face portion of the compass 30 is not visible to the user.

The compass 30 includes a lid 34. In one embodiment, the lid 34 of the compass 30 has a shape that is substantially the same as the shape of the base piece 32. However, one of skill in the art that the lid may have a different shape than the body. For example, in one embodiment of the present invention, the lid is smaller than the body. In another embodiment, the lid is larger than the body in at least one dimension. The lid 34 may be made of the same material as the base piece 32 or, optionally, made of a different material. In one embodiment of the present invention, a protractor dial 50, adapted for use to measure plunge, is formed on an exterior surface portion 48 of the lid 34. As best illustrated in FIG. 11, in one embodiment of the present invention, the protractor dial 50 includes two scales 51, 52 with 1° graduations operable to measure plunge from 0° to 90°.

The lid 34 is rotatably interconnected to the hinge assembly. In one embodiment, the lid includes two projections 53, 55 that are adapted to rotatably interconnect the lid 34 to the hinge assembly 36. In one embodiment, the projections 53, 55 have a generally cylindrical shape. Bores 54, 56 are formed through each of the projections 53, 55. In one embodiment, graduated clinometer dials 58, 60 are provided on exterior surfaces of the projections 53, 55 and are substantially concentric with the first and second bores 54, 56. When the compass 30 is in the closed configuration, the first clinometer dial 58 is oriented facing the left edge portion 44 of the base piece 32, as shown in FIG. 9, and the second clinometer dial 60 is oriented facing the right edge portion 45, as shown in FIG. 10. Although two graduated clinometer dials are illustrated, one of skill in the art will appreciate that a compass of the present invention may include only one clinometer dial on one of the projections 53, 55 or no clinometer dials on either of the projections 53, 55.

The hinge clinometer dials 58, 60 include graduated scales adapted for measuring dip angle simultaneously with the strike bearing on the compass face as discussed in more detail in conjunction with FIG. 20. The scale of the dials 58, 60 may include graduations for any desired angular precision. In one embodiment, illustrated in FIG. 10, the hinge clinometer dials 58, 60 measure approximately 270° in three 90° increments. In one embodiment, the dials 58, 60 include graduation lines adapted to indicate an angle of dip to within approximately 5°. In another embodiment, not illustrated for clarity, the graduation lines are adapted to indicate the angle of dip to within approximately 2°. In yet another embodiment, the dials are graduated in 1° increments. As will be appreciate by one of skill in the art, the compass 30 may also include a digital display to visually indicate an angle of dip to any desired degree of precision.

In one embodiment of the present invention, the clinometer dials 58, 60 include markings to correspond to one of two measure lines 59, 61 formed on each of the left and right edge portions 44, 45 of the base piece 32. The markings of the first clinometer dial 58 are distinct from the markings of the second clinometer dial 60. In the embodiment of the present invention illustrated in FIGS. 9-10, the first clinometer dial 58 and the first measure line 59 are indicated by corresponding dashed or broken lines. In contrast, the second clinometer dial 60 and the second measure line 61 are indicated by corresponding solid lines. As illustrated in FIG. 10, the second measure line 61 points to a "0" formed on the second clinometer dial 60 indicating that the lid 34 forms an angle of 0° with respect to the base piece 32.

One of skill in the art will appreciate that the markings of dials 58, 60 and lines 59, 61 may be formed of any combination of colors, line styles, letters, numbers, or other visual and/or tactile indicia adapted to differentiate the first and second clinometer dials 58, 60 and indicate which measure line 59, 61 to use to read a particular graduated clinometer dial. Accordingly, in one embodiment of the present invention, the first clinometer dial 58 and the first measure line 59 are a first color and the second clinometer dial 60 and the second measure line 61 are a second different color. In another embodiment, one of the first and second clinometer dials 58, 60 include a tactile indicia corresponding to a corresponding tactile indicia of one of the lines 59, 61. For example, in one embodiment the first clinometer dial 58 and line 59 include one or more dimples recessed into the lid projection 53 and the base piece 32. In another embodiment, the second clinometer dial 60 and line 61 include a protrusion forming a line projecting at least slightly above the surface of the lid projection 55 and the base piece 32.

In another embodiment of the present invention (illustrated in FIGS. 21-22), a single measure line 61 is provided on the base piece 32 that is adapted to indicate dip for both of the first and second clinometer dials 58, 60. For this embodiment, the first and second clinometer dials 58, 60 may have similar or identical markings. In one embodiment (illustrated in FIGS. 21-22), the first clinometer dial 58 has a marking that is different than the second clinometer dial 60.

The hinge assembly 36 is operable to rotate the lid 34 around both the major axis 40 and the minor axis 41 of the compass 30. In one embodiment, the hinge assembly 36 includes a gimbal substantially parallel to the minor axis 41 of the compass 30. The gimbal is adapted to interconnect the hinge assembly 36 to the base piece 32.

The hinge assembly 36 includes a hollow bore 110 (illustrated in FIG. 18) substantially parallel to a plane formed by the top edge portion 42 of the base piece 32. The hollow bore of the hinge assembly 36 is adapted to align with the first and second bores 54, 56 of the lid 34.

The lid 34 is rotatably interconnected to the hinge assembly 36. In one embodiment of the present invention, a sighting tube 38 inserted through the first and second bores 54, 56 of the lid and through the bore of the hinge assembly rotatably interconnects the lid 34 to the hinge assembly 36. The sighting tube 38 is retained between the lid 34 and the hinge assembly 36 by a friction fit. However, one of skill in the art will appreciate that other methods of interconnecting the sight tube 38 to the lid 34 and the hinge assembly 36 may be used with the compass 30 of the present invention.

Positioning the sighting tube 38 within the hinge assembly 36 is an important aspect of the present invention for several reasons. In this position, the bore of the hinge assembly 36 and the projections of the lid 34 protect the sight tube 38 from damage caused by impact. This position also enables rotation of the sight tube 38 around the minor axis of the compass without moving the compass base. Positioning the sight tube 38 within the hinge assembly 36 instead of on the lid or the base piece leaves both the lid and the base piece free of protrusions that would prevent, or interfere with, the use of direct contact methods of measuring geological features.

In one embodiment of the present invention, the sighting tube 38 is hollow and does not include any optics. In another embodiment, the sight tube 38 includes one or more removable lenses to form a telescope adapted to magnify an object viewed through the sight tube 38 by the user. A variety of lenses with different magnification levels may be added to, or removed from, the sight tube by the user. Additional lenses with or without magnification may be provided with cross hairs and stadia lines of different scales as will be appreciated by one of skill in the art. The user can select a lens with a desired magnification level, or a combination of lenses that provide the desired magnification level, and install the lenses in the sight tube in the field. If no magnification is necessary, the user can remove the lenses from the sight tube. In another embodiment, lenses with stadia lines are provided proximate to each end of the sight tube. In still another embodiment, a variety of different sight tubes with different optics and magnifications are provided that may be selected for use with the compass 30 by the user. In yet another embodiment, a variety of sight tubes with different optical qualities are provided. The user can remove a first sight tube from the compass and interconnect a second sight tube to the compass. Optionally, in another embodiment of the present invention, the hollow sight tube 38 may be replaced by a solid pin as will be appreciated by one of skill in the art.

The compass also includes a hinge lock that is operable to prevent rotation and inadvertent movement of the hinge assembly 36 around the minor axis 41 of the compass 30. In one embodiment of the present invention, the hinge lock comprises friction of the interconnection between the hinge assembly and the compass base. The friction of the hinge lock may be overcome by a force applied by a user to rotate the lid 34.

In another embodiment, illustrated in FIGS. 10-11, a hinge lock actuator 68 is associated with the hinge lock. The lock actuator 68 is adapted to be manipulated by a user's fingers to engage and disengage the hinge lock. In one embodiment of the present invention, the lock actuator 68 is a knob positioned on the right edge portion 45 of the base piece 32 and adapted to be rotated. In another embodiment, the lock actuator 68 can move from a position protruding from a portion of the base piece 32, illustrated in FIG. 10, to a retracted position within a housing 69 formed in the base piece 32, illustrated in FIG. 11, wherein the lock actuator 68 is substantially flush with one of the edge portions of the base piece. The lock actuator 68 may include a spring or other biasing means whereby the lock actuator 68 can be moved to the retracted position within the housing 69. In the protruding position, the lock actuator 68 can be manipulated to activate or release the hinge lock. Positioning the lock actuator 68 in the retracted position within the housing 69 protects the hinge lock and the actuator and also provides a substantially smooth (or linear) edge surface of the compass 30 that can be used for taking measurements with the compass 30 using the direct contact method described below.

The edge portions 43, 44, 45 of the base piece 32, the exterior surface portion 48 of the lid, and the top edge 37 of the hinge assembly 36 are generally linear and adapted to be placed against geological structures of interest. Accordingly, in one embodiment of the present invention, no components of the compass 30 project beyond the surfaces of edge portions 43, 44, 45 of the base piece 32, the exterior surface portion 48 of the lid 34, or the top edge 37 of the hinge assembly 36.

Figure 17:
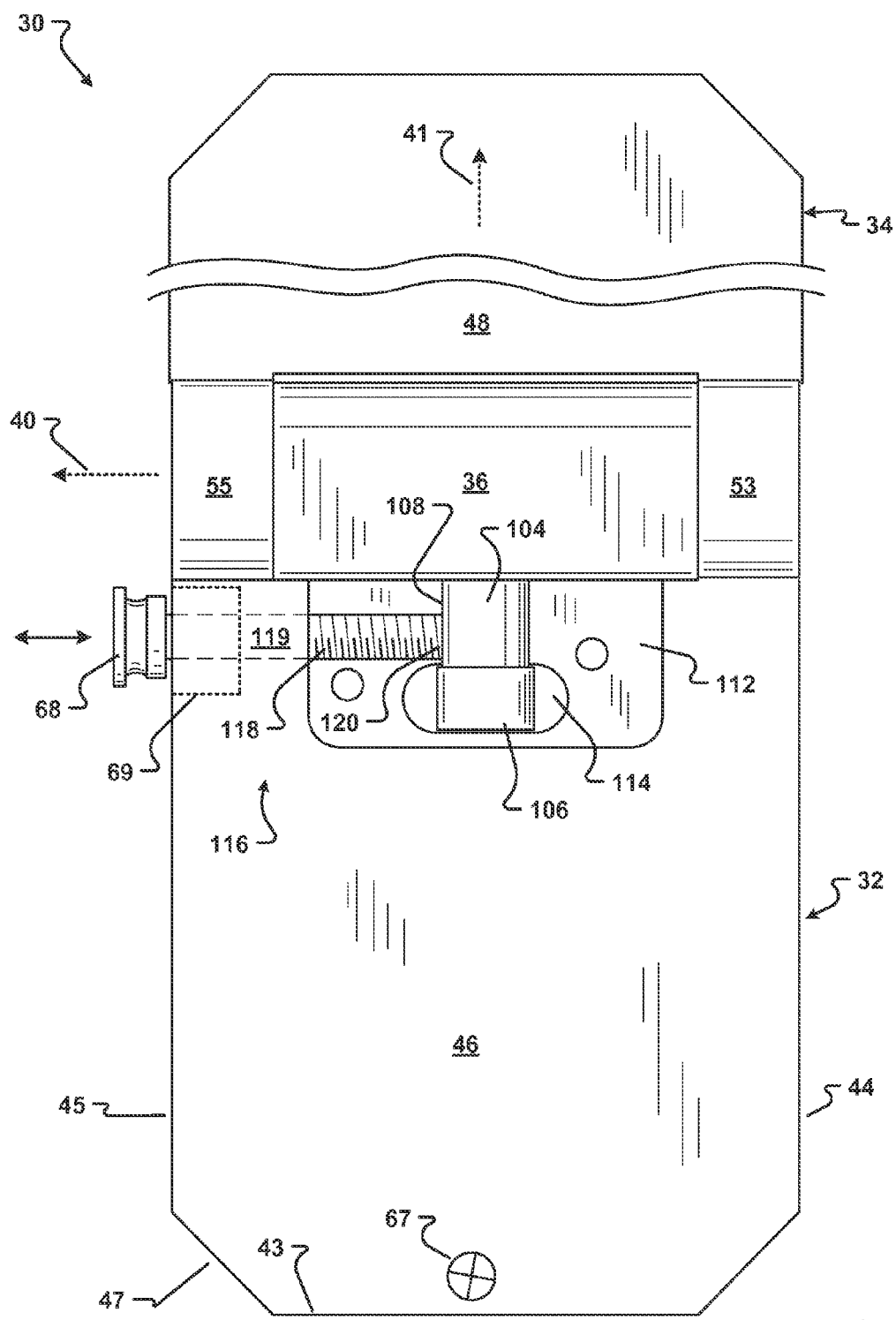
FIG. 17 is a partially fragmented bottom plan view of the geologic compass of FIG. 9 in an open configuration with a hinge box cover removed and further illustrating components of a hinge lock of one embodiment of the present invention in an engaged position.

The back portion 46 of the base piece 32 may also include a removable plate 63. The plate 63 may be opened and/or removed by removing a fastener 64, such as a screw, to reveal a receptacle, as illustrated in FIG. 17. In one embodiment, the receptacle is adapted for use in interconnecting the hinge assembly 36 to the compass base 32.

In one embodiment of the present invention, the compass 30 includes angled edge portions 47 between the bottom edge portion 43 and the left and right edge portions 44, 45 of the base piece 32. The angled edge portions may be used to help orient the compass 30, to visually or tactilely differentiate various configurations and components of the compass, and to protect the compass from impact. In one embodiment of the present invention, the angled edge portions 47 are substantially straight and angled at approximately 45° to the bottom edge portion 43. One of skill in the art will appreciate that the angled edge portions 47 may have any predetermined shape such as a curvilinear shape. Further, each angled edge portion 47 may have a different shape or a different angle with respect to the bottom edge portion 43. For example, in one embodiment, one of the angled edge portions forms an angle of approximately 30° with the bottom edge portion 43 and the other one of the angled edge portion forms an angle of approximately 60° with the bottom edge portion. In another embodiment of the present invention, one of the angled edge portions is generally straight and the other one of the angled edge portions has a generally curvilinear shape. In yet another embodiment of the compass 30 of the present invention, illustrated in FIGS. 20-23B, the base piece 32 is substantially rectangular without angled edge portions. In still another embodiment, the compass includes only one angled edge portion between the bottom edge portion 43 and one of the left or right edge portions 44, 45. In this embodiment, the bottom edge portion 43 and the other one of the left and right edge portions 44, 45 intersect in a corner at an angle of approximately 90°.

FIGS. 9-10 also illustrate elements of an adjustment mechanism 66 operable to rotate a graduated compass dial 74 (illustrated in FIGS. 12-13) of the compass 30. By actuating the adjustment mechanism 66, a user can adjust the compass dial 74 to compensate for the declination of the compass 30 based on the latitude of the user's location. The adjustment mechanism 66 may include a lock 67 to prevent unintended or inadvertent movement of the compass dial 74 from an orientation determined by the user. Although the adjustment mechanism 66 is illustrated in FIG. 10 as a screw positioned on the bottom edge portion 43 of the base piece 32, one of skill in the art will appreciate that the adjustment mechanism 66 may comprise other configurations and be arranged in a different manner. Accordingly, in one embodiment, the adjustment mechanism 66 is operated by a user's finger without a tool. In another embodiment, the adjustment mechanism is accessible on one or more of the bottom, left, and right edge portions 43, 44, 45 of the base piece 32. In yet another embodiment, the adjustment mechanism is positioned on the face portion 70 or the back portion 46 of the compass. The lock 67 may also be located in one or more different locations of the compass. In one embodiment, the lock 67 may comprise a button with two or more positions of use. The lock 67 may also be biased, such as by a spring, to move to, or remain in, one of a first position and a second position. In the first position, the button lock 67 prevents rotation of the compass dial 74. When the button lock 67 is in the second position, movement of the adjustment mechanism 66 rotates the compass dial 74. In still another embodiment, the functions of the adjustment mechanism 66 and the lock 67 may be combined into one element. In this embodiment, the adjustment mechanism is rotated to move the compass dial 74 and moves axially to release or engage a lock to prevent movement of the compass dial.

Figure 12:
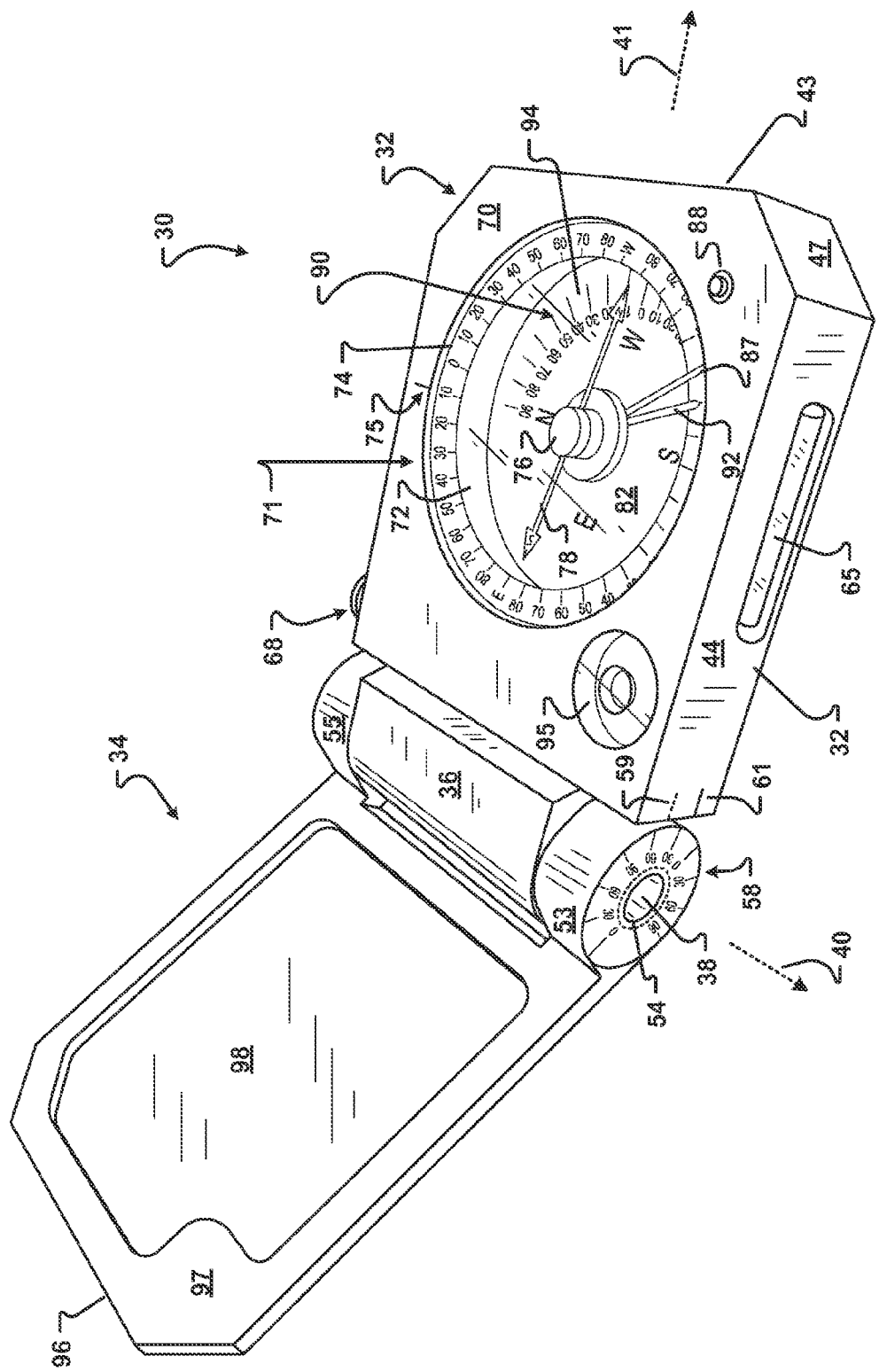
FIG. 12 is a perspective view of the geologic compass of FIG. 9 illustrating the compass in an open configuration with the lid rotated partially around a major axis of the compass and further illustrating a face portion of the compass base including a magnetic compass and a clinometer.
Figure 13:
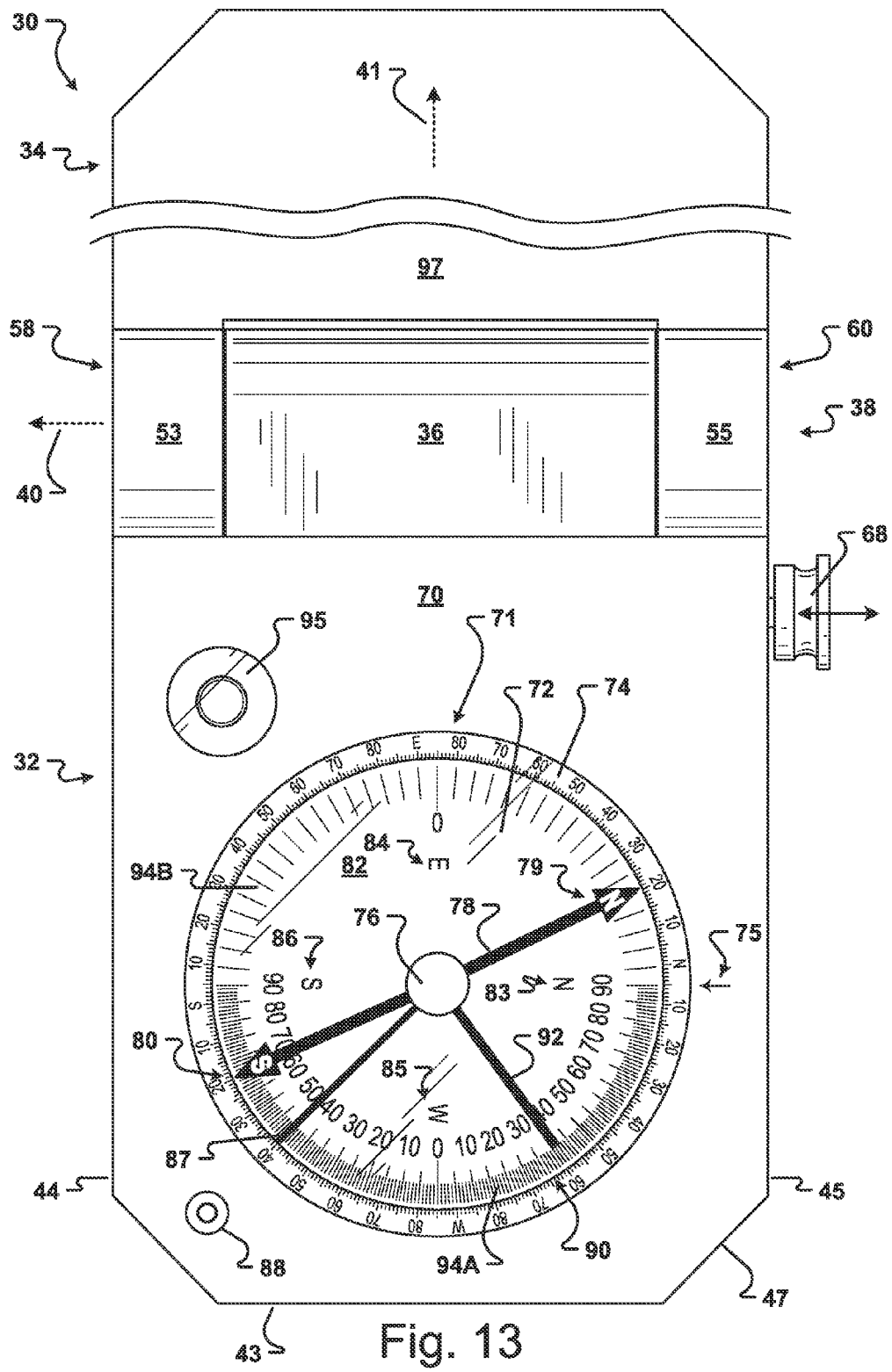
FIG. 13 is a partially fragmented top plan view of the geologic compass of FIG. 9 in an open configuration and providing another view of the face portion of the compass base and illustrating an embodiment of the magnetic compass and the clinometer of the present invention.

Referring now to FIGS. 12-13, a perspective view and a partially fragmented front elevation view of an embodiment of the compass 30 in a partially open configuration are provided. The base piece 32 of the compass 30 includes a face portion 70. A magnetic compass 71, needle lock 87, clinometer 90, and level 95 are positioned in the base piece 32 and visible in the face portion 70.

The level 95 is operable to indicate when the compass base piece 32 is substantially horizontal. In one embodiment of the present invention, the level 95 is a round or bull's eye level. In another embodiment, the level has a generally tubular shape, similar to level 65. As will be appreciated by one of skill in the art, any suitable level of any size, shape, or type may be used with the compass 30 of the present invention. Further, the level may be located in any position visible to the user when leveling the base piece 32. In one embodiment, the level 95 includes an electronic display to indicate when the base piece 32 is horizontal. In another embodiment, the display is operable to display an angle of the base piece 32 with respect to a horizontal plane. In yet another embodiment, two or more levels of the same or different types are positioned on the compass face portion 70.

The magnetic compass 71 includes a transparent cover 72, a graduated dial 74, a needle 78, and a compass rose 82. The cover 72 seals the magnetic compass 71 to prevent damage to, or interference with, the compass needle 78 and the clinometer needle 92. The transparent cover 72 is formed of any durable, scratch resistant material. In one embodiment, the cover 72 is formed of clear glass, plastic, or a crystal material.

The dial 74 of the magnetic compass 71 includes graduations of a predetermined scale to provide readings with the magnetic needle 78. In one embodiment of the present invention, illustrated in FIG. 13, the dial 74 includes 1° increments to provide 360° magnetic readings. The user can rotate the dial 74 to adjust for declination of the user's location. In one embodiment, the user can rotate the dial 74 by actuating the adjustment mechanism illustrated in FIG. 9. In another embodiment of the present invention, the dial 74 may be adjusted by the user by grasping the dial and applying a rotational force to the dial as will be appreciated by one of skill in the art. In this embodiment, the dial 74 is maintained in a position selected by the user by friction. A position mark 75 is located proximate to the graduated dial 74 to indicate a position of 0° declination. In the embodiment of the compass illustrated in FIG. 12, the compass dial 74 has been rotated approximately 10° as indicated by position mark 75 pointing to "10" on the compass dial 74. In the embodiment of the compass illustrated in FIG. 13, the compass dial 74 has been rotated approximately 5° as indicated by position mark 75 pointing to "5" on the compass dial 74.

The compass needle 78 is positioned on a post 76 that is substantially centered in the graduated compass dial 74. The needle 78 includes a North pointer 79 and a South pointer 80 extending in diametrically opposite directions. In one embodiment, the North and South pointers 79, 80 have distinct indicia. For example, in the embodiment of the present invention illustrated in FIG. 13, the North pointer 79 includes a "N" and the South pointer 80 includes an "S". However, as will be appreciated by one of skill in the art, other symbols, numbers, colors, shapes, and indicia may be used to distinguish the North pointer 79 from the South pointer 80.

The needle 78 is operable to freely rotate over a wide range of offset angles between the base piece 32 and a horizontal plane. Although the compass 30 is illustrated with a needle 78, one of skill in the art will appreciate that the magnetic compass 71 may include other means of indicating a magnetic bearing. In another embodiment of the present invention, the compass includes an electronic display operable present a digital display of compass readings to the user. In one embodiment, the electronic display is a liquid crystal display. In another embodiment, the electronic display includes light emitting diodes. An example of a digital compass is described in U.S. Pat. No. 4,095,348, which is incorporated herein by reference in its entirety.

The magnetic compass 71 includes a compass rose 82 with indicia for cardinal directions. In one embodiment, the compass rose 82 has a quadrant format. In another embodiment, the compass rose 82 has an azimuth format. In still another embodiment of the present invention, indicia for East 84 and West 85 are reversed compared to their alignment in a prior art compass rose. In one embodiment of the present invention, a North-South axis of the compass rose 82 is aligned substantially parallel with the major axis 40 of the compass 30. Accordingly, North 83 is indicated on the compass rose 82 proximate to the right edge portion 45 of the base piece 32 instead of pointing perpendicular to and away from the hinge as in prior compasses. Positioning North on the compass rose 82 proximate the right edge portion enables the user to measure the strike and dip of a plane using the direct contact method with only a single orientation of the compass 30 of the present invention. The major axis 40 of the compass 30 is aligned with strike and placed along the plane of the geological feature being measured. The compass face portion 70 is leveled with the bull's-eye level 95 or the side levels 65 to ensure accurate needle orientation. The lid 34 is rotated until it rests against the plane being measured.

In one embodiment of the present invention, the compass rose 82 of the magnetic compass 71 and the North pointer 79 of the compass needle 78 can be repositioned by the user so that the North-South line is aligned in any orientation, including substantially perpendicular to the major axis 40. This orientation of the compass rose 82 and the compass needle 78 enables the user to directly measure dip direction instead of strike direction, which is a preferred technique for some geologists and allows greater versatility of the compass 30 of the present invention.

In another aspect of the present invention, the entire compass 71 is rotatable. The user can rotate the compass 71 to a predetermined orientation within the base piece. In one embodiment, declination adjustment mechanism 66 is operable to rotate the compass 71 with respect to the base piece 32. In another embodiment, the user may rotate the compass 71 by hand without the use of any tools. One or more stops may be provided to help align the compass in one or more pre-determined orientations. In one embodiment, the stops are detents positioned approximately every 90° between the compass and the base piece. In another embodiment, a lock is operable to prevent inadvertent or unintended movement of the compass 71 with respect to the base piece 32.

The clinometer 90 generally includes a needle 92 and a clinometer dial 94. In one embodiment, the clinometer needle 92 is co-located axially on the post 76 with the needle 78 in the magnetic compass 71. However, other positions for the clinometer needle are contemplated. The clinometer needle 92 is freely hanging on the post 76 and gravity-driven. In one embodiment, the clinometer dial 94 is located on a portion of the compass rose 82. In another embodiment of the present invention in which the compass rose 82 can be rotated by the user, the clinometer dial 94 is separate from the compass rose 82 and the clinometer dial is stationary. For example, in one embodiment, the clinometer dial is interconnected to portion of a sidewall of the recess in which the magnetic compass 71 is positioned within the compass base 32.

In one embodiment of the present invention (illustrated in FIG. 22), the clinometer dial includes 1° graduations. However, it will be appreciated by one of skill in the art that the scale of the clinometer dial may have graduations for any predetermined level of precision. In another embodiment of the present invention, the clinometer dial 94 includes graduations for 360°, as illustrated in FIG. 13. The frequency of the graduations, a scale of the clinometer dial 94, or indicia of the clinometer dial 94 may vary. For example, in one embodiment, a first portion 94A of the clinometer dial includes graduations with a first spacing, scale, and indicia and a second portion 94B of the clinometer dial includes graduations with a different second spacing, scale, and indicia. Further, the clinometer 90 may optionally include an electric display of any type operable to display a measured angle to any predetermined degree of precision. Accordingly, in one embodiment of the present invention, the clinometer 90 includes a sensing unit operable to determine an angle of the clinometer needle 92 in comparison to an angle of rotation of the compass base piece 32. The clinometer 90 includes an electronic display, such as a liquid crystal display, an LED display, or an electric display of any other type, to display the angle to the user.

A needle lock mechanism 87 is provided to control movement of both the magnetic needle 78 and the clinometer needle 92. In an engaged position, the needle lock is operable to prevent inadvertent or unintended movement of needles 78, 92. In a disengaged position, needles 78, 92 can move freely. In one embodiment of the present invention, the lock mechanism includes a temporarily unlocked position which is operable to enable needles 78, 92 to move freely for one or more of a predetermined period of time and a predetermined angle of movement. The temporary unlocked position is beneficial to allow the needles 78, 92 to adjust slightly for movement of the compass 30 without significant oscillation. In one embodiment of the present invention, when in the engaged position, the lock mechanism 87 lifts needles 78, 92 at least partially off of the post 76 as will be appreciated by one of skill in the art.

A lock actuator 88 is provided to move the lock mechanism 87 to one of the disengaged, engaged, and temporarily unlocked positions. The lock actuator 88 may be biased to move to one or more of the positions. In one embodiment of the present invention, the lock actuator 88 is a button with positions corresponding to each of the disengaged, engaged, and temporarily unlocked positions of the needle lock mechanism. However, it will be appreciated by one of skill in the art that the lock actuator 88 may be of any other type. For example, in one embodiment of the present invention, the lock actuator 88 comprises a switch that can slide between two or more positions corresponding to each position of the lock mechanism. In another embodiment of the present invention, the lock actuator comprises a pivotable switch or a rotatable disc. In still another embodiment of the present invention, the compass 30 may include two or more different needle lock actuators 88 accessible from two or more different portions of the compass.

In one embodiment of the present invention, pressing the needle lock actuator 88 moves the needle lock mechanism 87 to the engaged position. The lock mechanism 87 may remain in the engaged position until the lock actuator is released. Alternatively, lock mechanism 87 may remain in the engaged position until the lock actuator is pressed a second time to move to the disengaged or temporarily unlocked positions.

In one embodiment of the present invention, the needle lock mechanism 87 is adapted to automatically move to the engaged position when the lid 34 is rotated to the place the compass 30 in the closed configuration. When the lid 34 is rotated to an open configuration, the lock mechanism is adapted to automatically move to the disengaged position. In another embodiment of the present invention, a portion of the interior surface 97 of the lid 34 applies a force to the lock actuator 88 when the lid 34 is in the closed configuration to move the needle lock mechanism to the engaged position. In yet another embodiment of the present invention, a lock actuator is associated with the hinge assembly 36. In this embodiment, when the lid 34 is rotated past a predetermined orientation with respect to the major axis 40 of the compass, the lock mechanism 87 moves to one of the engaged and the disengaged positions. Automatically locking the needles 78, 92 in any of these manners beneficially prevents damage to the needles during movement or storage of the compass 30.

In another embodiment of the present invention, the lock mechanism 87 is biased in the engaged position. Pressing the lock actuator 88 moves the lock mechanism 87 to the disengaged position or the temporarily disengaged position. Accordingly, pressing the lock actuator 88 unlocks the compass and clinometer needles 78, 92 to allow them to properly align or freely rotate. When the lock actuator 88 is released, the lock mechanism 87 returns to the engaged position to lock the needles 78, 92 in place for reading and transport. In this embodiment of the present invention, opening and closing the lid 34 does not change the state of the lock mechanism.

The first measure line 59 of the compass illustrated in FIG. 12 points to a position approximately between "30" and "60" on a portion of the first clinometer dial. This indicates that an angle between the lid 34 and a horizontal plane formed by the base piece 32 is approximately 45°.

FIG. 12 also illustrates an embodiment of the interior surface portion 97 of the lid. The interior surface portion 97 of the lid 34 is adapted to prevent contact between the lid and the transparent cover 72 of the magnetic compass 71. In one embodiment of the present invention, a concavity 98 is formed on at least a portion of the interior surface portion 97 of the lid. The concavity 98 may have any predetermined shape and depth. The concavity 98 is adapted to prevent or limit contact between the lid 34 and the transparent cover 72 of the magnetic compass 71. In one embodiment, the depth of the concavity 98 is sufficient to prevent dust or sand particles trapped between the transparent cover 72 and lid 34 from being forced against the transparent cover 72. In another embodiment of the present invention, the concavity 98 is formed of a transparent window positioned in an aperture through the lid. The transparent window may have the shape of the concavity 98 and is thinner than the material of the lid. In this manner, the transparent window provides an offset or separation between the lid 34 and the transparent cover 72 when the lid is in the closed position. The transparent window also allows the user to view the magnetic compass 71 and clinometer 90 when the compass 30 is in the closed configuration.

Figure 14:
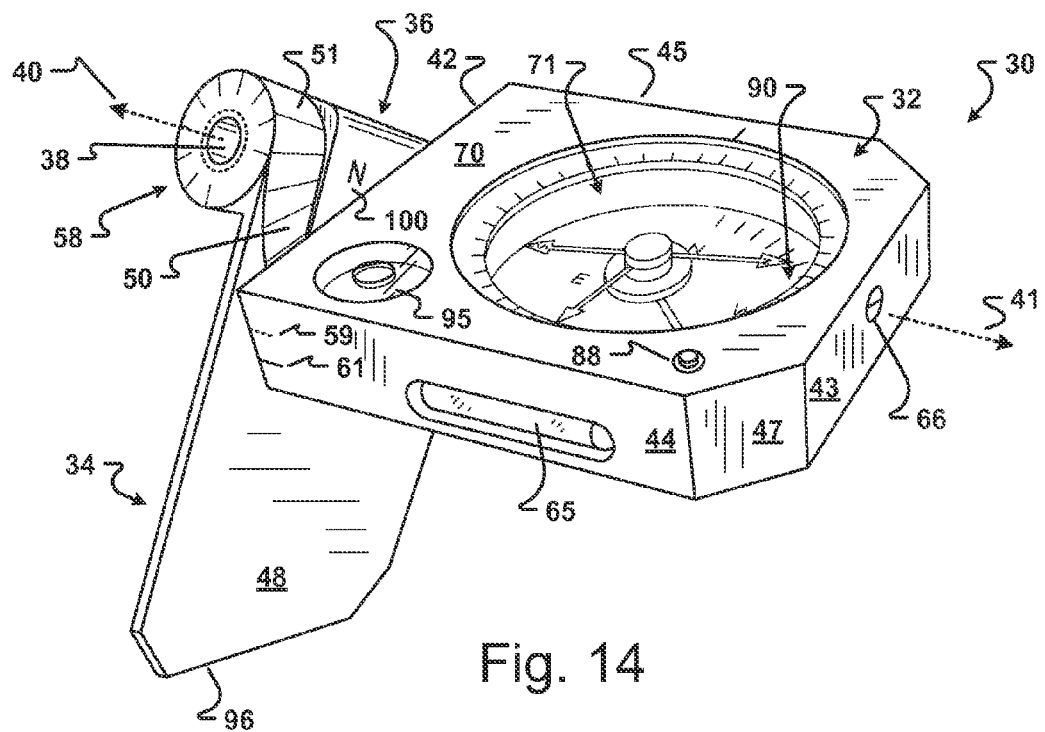
FIG. 14 is another perspective view of the geologic compass of FIG. 9 in another open configuration with the lid rotated approximately 270° around the major axis and the lid also rotated approximately 40° around a minor axis as indicated by the intersection of the compass base piece with the protractor dial of the lid and further illustrating a directional indicia of one embodiment of the present invention.
Figure 15:
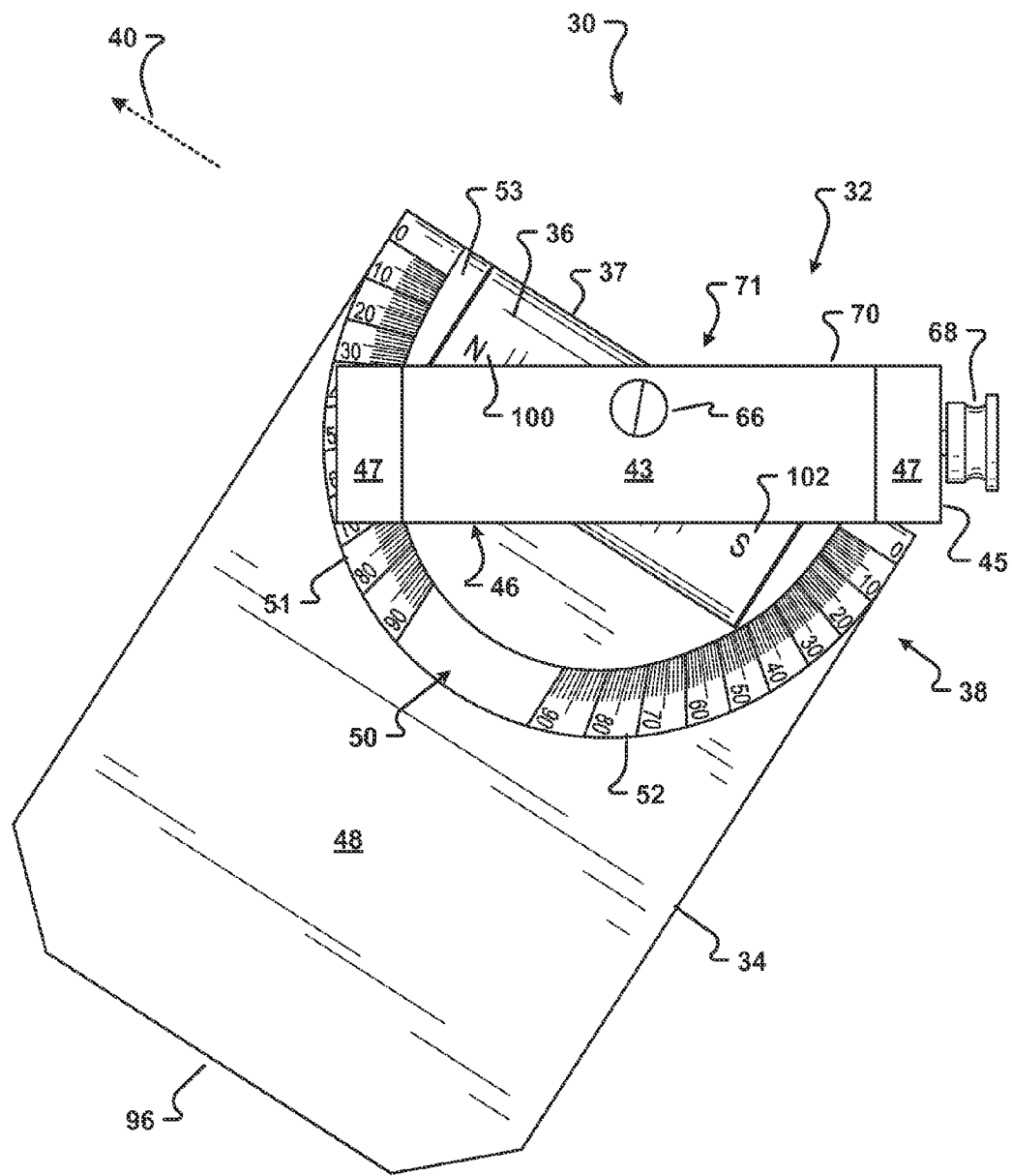
FIG. 15 is a front elevation view of the geologic compass of FIG. 9 in a configuration similar to the open configuration illustrated in FIG. 14 and illustrating the compass base in a substantially level position with the lid rotated approximately 270° around the major axis and the lid also rotated approximately 30° around the minor axis as indicated on the protractor dial of the lid.

Referring now to FIGS. 14-15, the compass 30 is illustrated in two similar open configurations with the lid 34 rotated approximately 270° around the major axis 40 and also rotated around the minor axis 41. In FIG. 14, the lid is rotated approximately 40° around the minor axis as indicated by the intersection of the face 70 of the compass base piece 32 with the first protractor scale 51 of the protractor dial. In FIG. 15, the lid is rotated approximately 30° around the minor axis (which projects perpendicular to the surface of FIG. 15) which is also indicated by the intersection of the base piece 32 with the first protractor scale 51. In these configurations, the exterior surface portion 48 of the lid 34 is positioned proximate to the top edge portion 42 of the base piece 32. The angle between the base piece 32 and the lid 34 is indicated by the intersection of the base top edge portion with the protractor dial 50 of the lid 34. In this manner, the protractor dial 50 is used to measure a plunge angle when the free or distal end 96 of the lid 34 is aligned with a lineation of interest.

One aspect of the present invention includes indicia 100, 102 to indicate which end 79, 80 of the compass needle 78 to read when measuring the trend of a lineation. This is necessary as trend is uni-directional. The indicia 100, 102 may comprise any combination of numbers, letters, symbols, and colors to indicate which end of the compass needle 78 to read to measure trend. In one embodiment of the present invention, the indicia 100, 102 are positioned on the hinge assembly 36. In another embodiment, the North indicia 100 comprises the letter "N" and the South indicia 102 comprises the letter "S." In one embodiment of the present invention, the North indicia 100 has a color that matches the color of the North pointer 79 of the needle 78 and the South indicia 102 has a different color that matches the color of the South pointer 80. In FIGS. 14-15, the North indicia 100 is visible above the compass face portion 70 indicating that the North end 79 of the compass needle 78 should be used to record the trend. The South indicia 102 is illustrated in FIG. 15 below the base piece 32.

Figure 16:
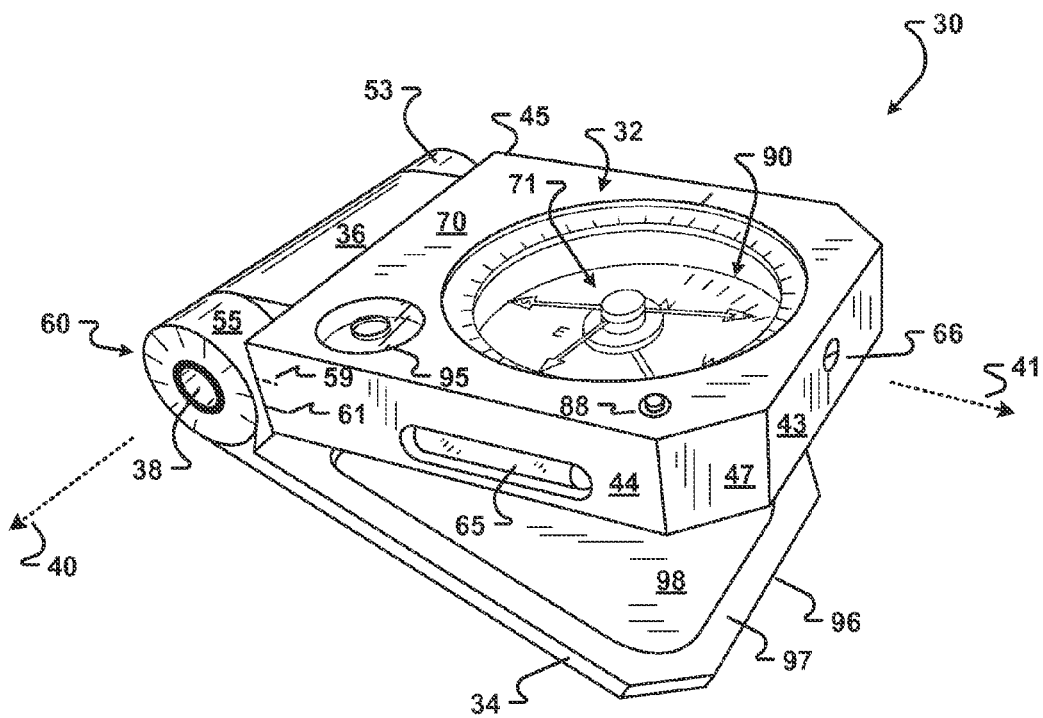
FIG. 16 is yet another perspective view of the geologic compass of FIG. 9 illustrating the compass in still another open configuration in which the lid has been rotated approximately 180° around the minor axis and also rotated approximately 300° around the major axis and further illustrating the second side of the sight tube positioned proximate to the left edge portion of the compass base.
Figure 22:
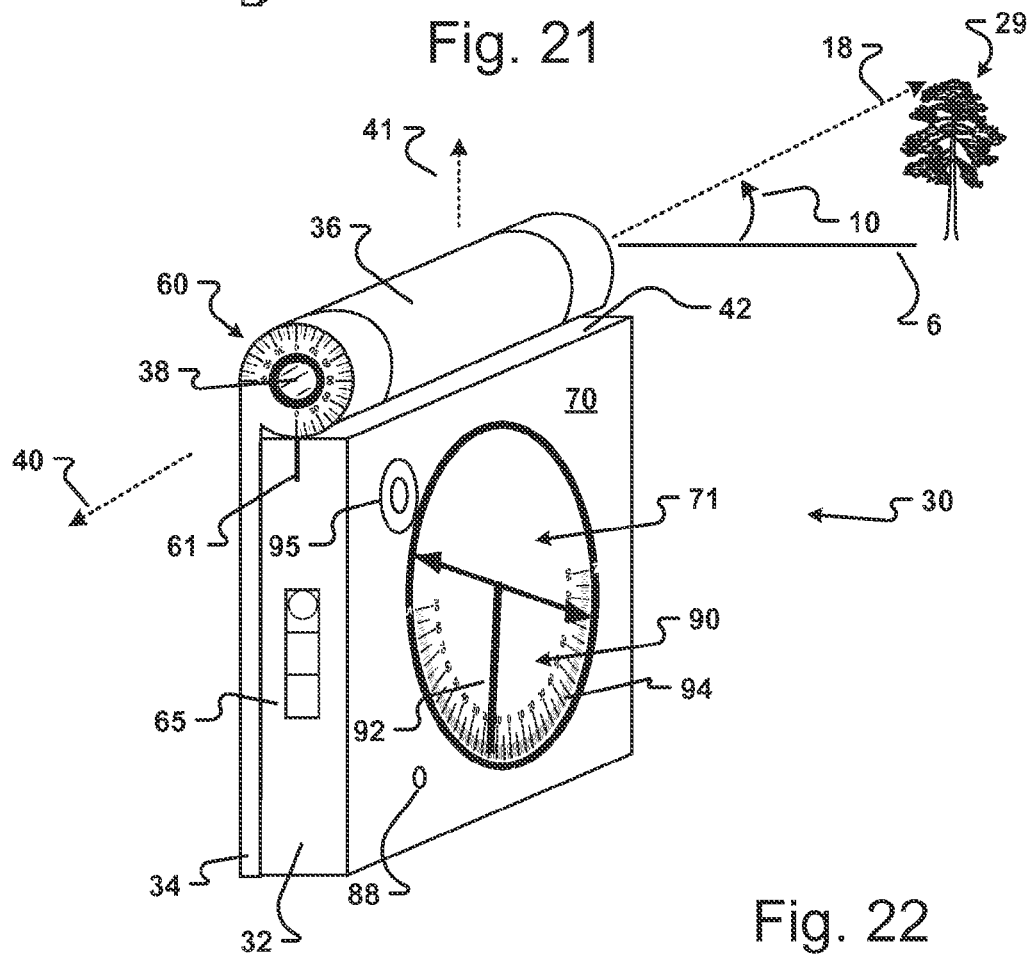
FIG. 22 illustrates a method of sighting an angle in a vertical plane to calculate height or elevation of an object with a geologic compass of an embodiment of the present invention.

Referring now to FIG. 16, when the hinge assembly 36 and the lid 34 are rotated 180° around the minor axis 41, the lid 34 can be rotated around the major axis 40 by greater than 180°. In this manner, the lid interior surface 97 can be positioned proximate to the back portion 46 of the compass 30, or in contact with the back portion 46 as illustrated in FIG. 22. In the configuration illustrated in FIG. 16, the second clinometer dial 60 is oriented facing the left edge portion 44 of the base piece 32 after the hinge assembly is rotated around the minor axis. Accordingly, in this configuration, the second measure line 61 is used to record dip angle on the graduated scale of the second clinometer dial 60.

Referring now to FIG. 17, a partially fragmented bottom plan view of the compass 30 is provided. The protractor dial is not illustrated on the lid exterior surface portion 48 for clarity. A hinge receptacle 112 of one embodiment of the present invention is illustrated formed in the base piece 32 and is adapted to receive an extension 104 of the hinge assembly. In one embodiment of the present invention, the extension 104 projects substantially perpendicularly from the hinge assembly 36. However, one of skill in the art will appreciate that the extension may have different shapes and orientations. Although the hinge receptacle 112 is illustrated with an aperture accessible from the back portion 46 of the base piece 32, one of skill in the art will appreciate that the hinge receptacle 112 may be positioned in different locations and accessible from different portions of the base piece 32.

The extension 104 extends from the hinge assembly substantially concentric to the minor axis of the compass 30. In one embodiment of the present invention, the extension 104 has a generally cylindrical or barrel shaped body. A flange 106 is formed at a distal or free end of the extension 104 away from the hinge assembly. The flange 106 has a size greater than a radius of the extension 104 and is adapted to fit into a recess 114 formed within the hinge receptacle 112. When the flange 106 is aligned with the recess 114 and the receptacle cover 63 (illustrated in FIG. 10) is interconnected to the base piece 32, the hinge assembly 36 is rotatably interconnected to the base piece 32. In one embodiment, the flange 106 has a generally cylindrical shape, although the flange may have any shape adapted to prevent unintended removal of the extension 104 from the hinge receptacle 112.

In one embodiment, at least two catches 108 are formed on the extension 104 to receive contact from a portion of the hinge lock. In one embodiment, the catches are formed on a portion of the flange 106. In another embodiment, illustrated in FIG. 17, the catches 108 are formed on the body of the extension. The catches 108 may be of any shape or orientation adapted to receive a force from the hinge lock to prevent unintended or inadvertent rotation of the extension 104 within the hinge receptacle 112. In one embodiment, the catches 108 are generally flat portions formed on the extension 104. In another embodiment, the catches comprise recesses formed in the surface of the extension 104. In yet another embodiment, the extension has a hexagonal or an octagonal cross-section. In still another embodiment, two catches 108 are formed on the extension 104 to lock the lid 34 in two predetermined positions at approximately 0° and 180° of rotation around the minor axis 41 with respect to the base piece 32. However, any number of catches 108 could be formed to lock the lid 34 in a variety of predetermined orientations with respect to the base piece 32 of the compass. Although FIG. 17 illustrates an extension 104 of the hinge assembly interconnecting the hinge assembly to the base piece, one of skill in the art will appreciate that the hinge assembly may be rotatably interconnected to the base piece in any number of ways. For example, in one embodiment, an extension projects from a portion of the base piece to rotatably interconnect the hinge assembly to the base piece. In another embodiment, the extension of the base piece or the extension 104 of the hinge assembly 36 are formed of two pieces that enable one piece to rotate around the minor axis of the compass with respect to the second piece.

FIG. 17 also illustrates one embodiment of the hinge lock 116 that includes a lock screw 118 connected to the hinge lock actuator 68. The lock screw 118 is threaded through an aperture 119 in the base piece 32. An end portion 120 of the lock screw 118 distal to the lock actuator 68 is adapted to apply a force to the catch 108 of the extension of the hinge assembly. Accordingly, when the actuator 68 is rotated to engage the hinge lock 116, the hinge lock 116 maintains the hinge assembly 36 in a predetermined orientation. The hinge lock 116 is illustrated in the engaged position wherein the end portion 120 of the lock screw 118 applies a force to a portion of the hinge assembly extension 104 to prevent inadvertent or unintended rotation of the hinge assembly and the lid around the minor axis 41. In this embodiment of the present invention, the hinge lock 116 can be moved to the engaged position by turning the actuator 68 in a first direction. The lid 34 can rotate around the major axis 40 while the hinge lock is in the engaged position. The actuator 68 can be rotated in a second direction to move the screw end portion 120 away from the hinge assembly extension 104. Thus, the hinge lock can be moved to the disengaged position. When the hinge lock is in the disengaged position, the hinge assembly 36 and the lid 34 can rotate around the minor axis 41.

One of skill in the art will appreciate the hinge lock 116 may comprise other elements adapted to prevent rotation of the hinge assembly around the minor axis 41 of the compass. In one embodiment, the hinge lock includes a lever adapted to protrude from a portion of the base piece 32. The actuator 68 is operable to move the lever from a retracted position to a protruding position. In the protruding position, the lever applies a force to a portion of the hinge assembly 36 to prevent unintended or inadvertent movement of the hinge assembly 36 around the minor axis 41.

In another embodiment of the present invention, the hinge lock 116 includes one or more ball bearings positioned in chambers on one or more of the base piece and on the hinge assembly 36. In one embodiment, the chambers are formed on the top edge portion of the base piece 32 and in a portion of the hinge assembly proximate to the base piece. The ball bearings are biased to protrude at least partially from the chambers forming detents to apply a force to one or more portions of the hinge assembly 36 and/or the base piece. The bias force is adapted to prevent unintended rotation or movement of the hinge assembly 36 around the minor axis. However, the bias force can be overcome by a rotational force applied to the lid or the base piece by the user to enable rotation of the lid 34 around the minor axis.

One of skill in the art will appreciate that other mechanisms for actuating the hinge lock 116 not requiring a lock actuator 68, such as the knob, may be used with the compass 30 of the present invention. In still another embodiment, the hinge lock comprises internal spring-loaded ball bearings that selectively move in and out of divots to lock the hinge assembly 36 in a desired orientation. In this embodiment, the lock actuator can move between a first position and a second position of operation. The lock actuator may be biased to move to either the first or second position. When the lock actuator is in one of the first and second positions, the hinge lock is deactivated and the lid 34 can rotate around the minor axis 41. In contrast, when the lock actuator is in the other one of the first and second positions, the hinge lock is activated, preventing the lid 34 from rotating around the minor axis 41.

Figure 18:
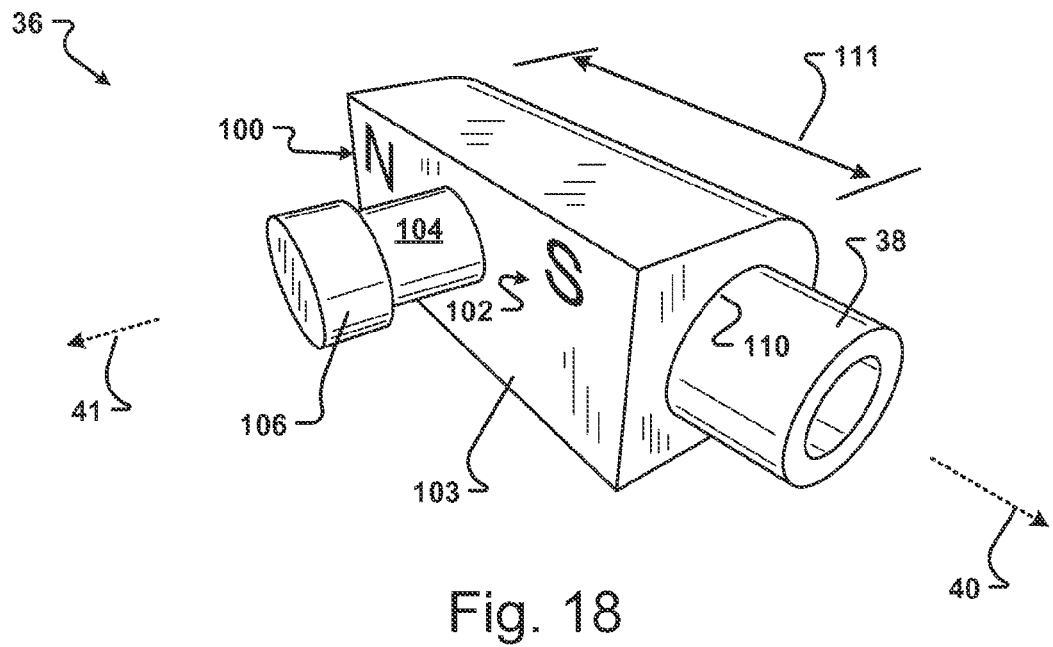
FIG. 18 is a perspective view of a hinge assembly and sight tube according to an embodiment of the present invention.

Referring now to FIG. 18, the hinge assembly 36 and sight tube 38 according to one embodiment of the present invention are illustrated separated from the base piece 32 and the lid 34 of the compass 30. The hinge assembly 36 may be removed from the base piece 32 of the compass 30 by the user. In this manner, the user may use the magnetic compass 71 and clinometer 90 of the base piece 32 without the sight tube 38 and the lid 34. This is beneficial when the sight tube and lid are not necessary, to reduce the weight of the compass 30, or to service or replace one or more components of the compass 30.

The hinge assembly 36 has a length 111 substantially parallel to the major axis of the compass. A bore 110 is formed through the hinge assembly 36 substantially perpendicular to the extension 104 of the hinge assembly. The sight tube 38, illustrated in FIG. 18 positioned in bore 110, has an external diameter less than the internal diameter of the bore. Accordingly, the sight tube 38 can rotate within the bore 110. In one embodiment, the sight tube can freely rotate with respect to the bore 110 such that the lid 34 of the compass will rotate freely. In another embodiment of the present invention, the diameters of the sight tube 38 and the bore 110 are substantially equal and friction between the sight tube 38 and the bore 110 prevents the lid 34 from rotating freely. The user can manually rotate the lid in this embodiment. In still another embodiment of the present invention, the compass includes a lid lock adapted to retain the lid in one or more predetermined orientations with respect to the major axis of the compass.

The sight tube 38 may be removed from the bore 110 of the hinge assembly 36 by the user. Optionally, in one embodiment of the present invention, a variety of sight tubes 38 with different optics in a variety of magnifications are provided. The user may select a desired sight tube with a predetermined magnification and position the sight tube in the bore of the hinge assembly for use with the compass 30. In one embodiment of the present invention, a lock comprising a biasing member is provided to retain the sight tube 38 in a predetermined position within the bore 110 while allowing the sight tube 38 to rotate axially. In one embodiment of the present invention, the bore 110 of the hinge assembly may be used to sight objects without the sight tube.

In one embodiment of the present invention, a substantially flat portion 103 is formed the hinge assembly as illustrated in FIG. 18. The North-South indicia 100, 102 may be positioned on the flat portion 103. One of skill in the art will appreciate that the indicia may be located on other portions of the hinge assembly or arranged in a different manner. In one embodiment of the present invention, a graduated protractor dial, similar to protractor dial 50, is positioned on the flat portion 103 of the hinge assembly. In this embodiment, a first protractor scale, the same as or similar to the first protractor scale 51, is positioned proximate to the North indicia 100 on the flat portion 103. A second protractor scale, the same as or similar to the second protractor scale 52, is positioned proximate to the South indicia 102 on the flat portion 103. The first and second protractor scales of this embodiment are adapted to measure plunge when the exterior surface portion 48 of the lid 34 is positioned substantially parallel to a plane formed by a geological structure 4. Optionally, the first and second protractor scales of this embodiment can be used to determine an angle in a vertical plane to calculate the height or elevation of an object sighted through the sight tube. In this embodiment of the present invention, the graduated protractor dial of the hinge assembly 36 may be used when the lid 34 is removed from the compass 30.

Figure 19:
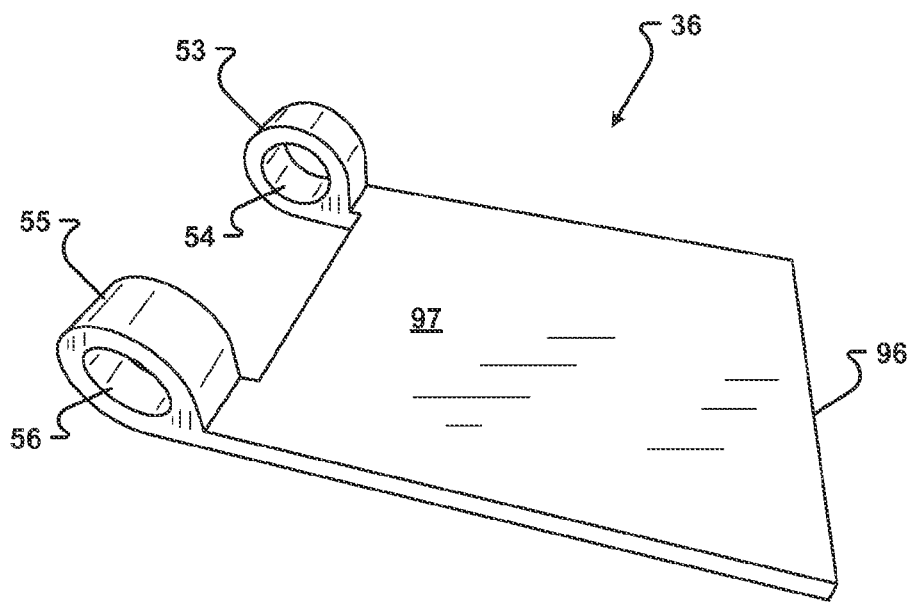
FIG. 19 is a perspective view of a lid of one embodiment of the present invention with the lid removed from a geologic compass of the present invention.

Referring now to FIG. 19, an embodiment of a lid of the present invention is illustrated separated from the hinge assembly 36. The lid interior surface portion 97 does not include a concavity in contrast to the lid 34 illustrated in FIG. 12. The lid includes two projections 53, 55 that each include a bore 54, 56. The bores 54, 56 align with each other and are separated by a distance greater than, but substantially equal to, the length 111 of the hinge assembly. A distal end 96 of the lid 34 is positioned opposite to the projections 53, 55. To interconnect the lid to the hinge assembly, the projections are positioned with the bores 54, 56 aligned with the bore 110 of the hinge assembly 36. Then, the sighting tube 38 is inserted through the bores of the lid 34 and the bore of the hinge assembly 36. The sighting tube is retained in the bores 54, 56 of the lid 34 by friction between the exterior surface of the sighting tube and the interior surfaces of the bores 54, 56 of the lid. Additionally or alternatively, at least one of the projections 53, 55 can include a set screw along a diameter of the bore. When the set screw is tightened, a portion of the set screw projects radially within the bores 54, 56 of the projections against the exterior surface of the sight tube 38 to secure the sight tube within the bores 54, 56. In still another embodiment, the sight tube 38 is retained in the bore by threads formed on a portion of the sight tube and within at least one of the bores 54, 56.

Figure 20A:
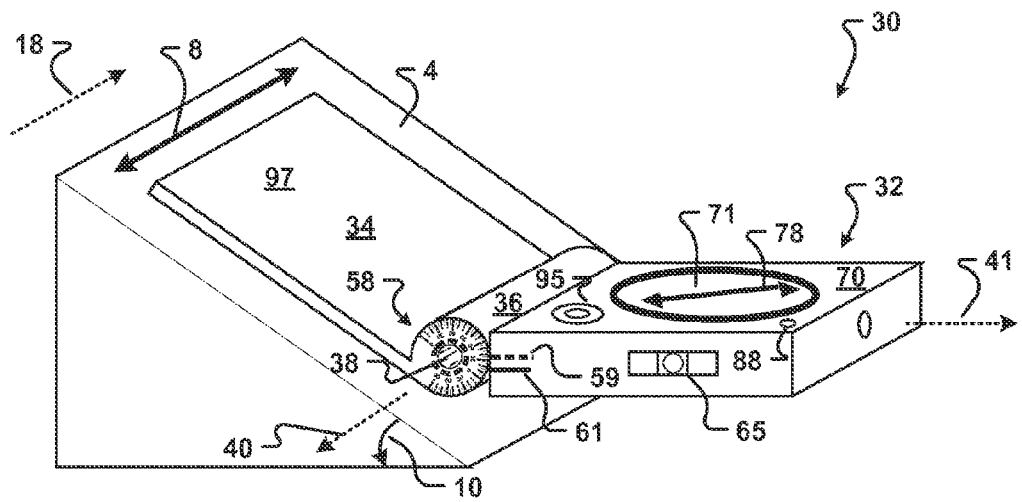
FIGS. 20A-20D illustrate methods of measuring strike and dip of different geological features according to an embodiment of the present invention using a geologic compass of an embodiment of the present invention.
Figure 20B:
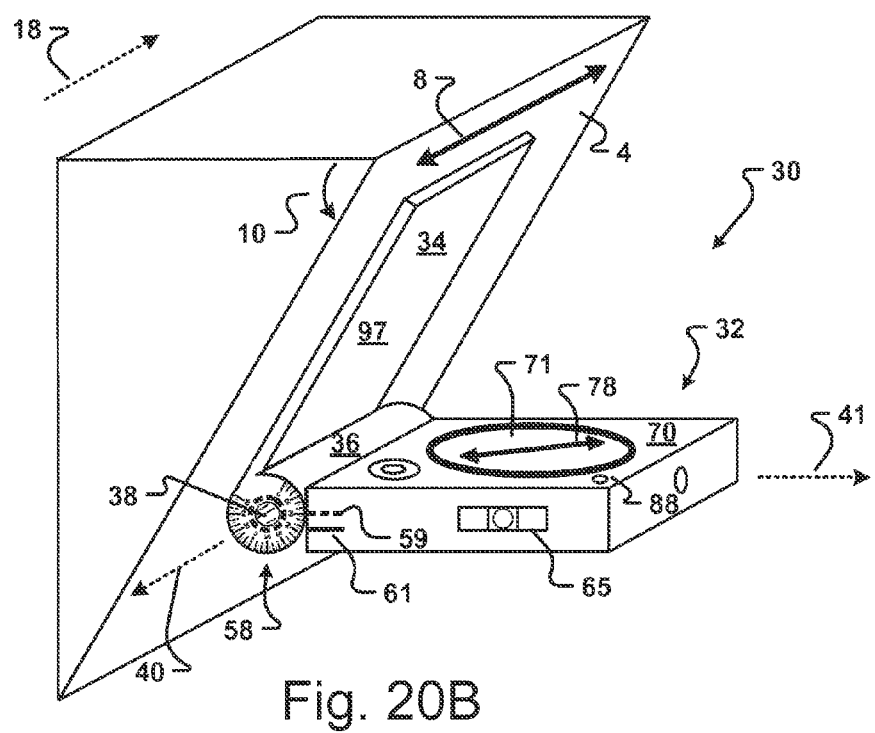

Referring now to FIGS. 20A-20B, a direct contact method of measuring strike and dip of a variety of geological structures 4 according to an embodiment of the present invention is illustrated. The major axis 40 of the compass 30 is aligned with strike 8 and the lid 34 is placed in contact with or extending substantially parallel to a plane of the geological structure 4 being measured. The face 70 of the compass is leveled with the bull's-eye level 95 and/or one or more of the side levels 65 to ensure accurate compass needle 78 operation. The measurement of the dip angle shown on the first clinometer dial 58 indicated by the first measure line can be recorded simultaneously with the strike bearing shown by the needle 78 of the magnetic compass 71. In the embodiment of the compass 30 illustrated in FIGS. 20A-20B, the first clinometer dial 58 includes a broken line and the dip angle is indicated by the corresponding broken line of the first measure line 59. The dip angle indicated in FIG. 20A by the first measure line 59 on the first clinometer dial 58 is approximately 35°. The first measure line 59 indicates a dip angle of approximately 60° on the first clinometer dial 58 in FIG. 20B. Dip direction can be recorded without moving or repositioning the compass 30. Planes of any orientation are measureable with the compass 30 of the present invention, including horizontal, near-horizontal, overhanging, 'left' and 'right' dipping, near-vertical, and vertical.

Figure 20C:
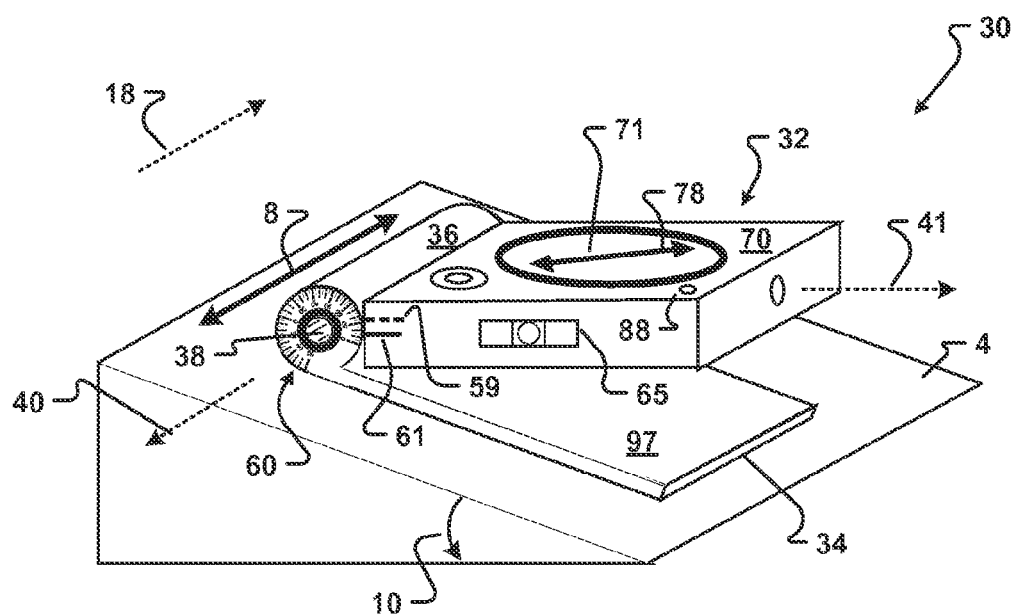
Figure 20D:
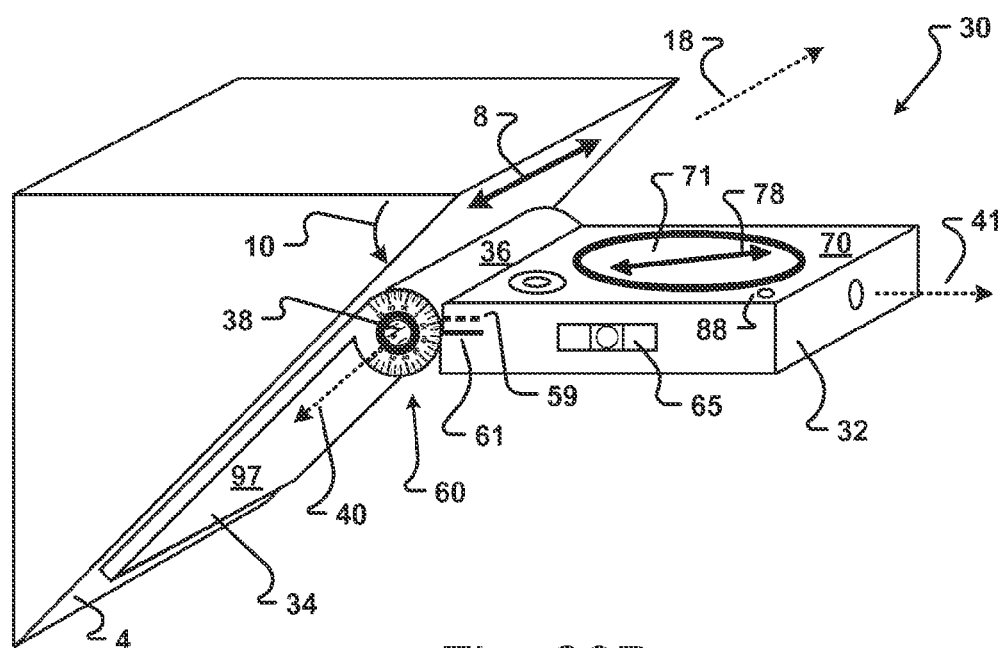

If necessary, the hinge assembly 36 and lid 34 can be rotated approximately 180° around the minor axis 41 and locked into place, as illustrated in FIG. 20C and FIG. 20D. The lid 34 may then be rotated around the major axis 40 to position the lid against the plane being measured. The compass 30 can be used with the hinge assembly 36 to the left or right side of the compass face 70 as well, further enhancing the versatility of the compass. The second measure line 61 indicates that the dip angle is approximately 25° on the second clinometer dial of FIG. 20C and approximately 45° on the second clinometer dial of FIG. 20D.

If the face 70 of the compass is not visible to the user, for example, when measuring an overhanging plane as illustrated in FIG. 20D, one or more of the side levels 65 of the compass base 32 can be used to level the compass face 70. When the compass is substantially level, the lock actuator 88 may be used to move the needle lock 87 to the engaged position to preserve a bearing measurement until the compass is moved and the compass face 70 is visible. In one embodiment of the present invention, the lock actuator 88 is pressed to move the lock mechanism 87 to the engaged position. In another embodiment of the present invention, the lock actuator 88 is released to engage the lock mechanism 87 to prevent movement of the magnetic needle 78.

In one embodiment of the present invention, the magnetic compass 71 is operable when the compass face 70 is facing downward. In this manner, the user can measure an overhanging plane with the compass face 70 facing the ground.

As described above, the first and second clinometer dials 58, 60 may be coded to ensure accurate readings from the appropriate scale when the lid 34 is rotated around the minor axis 41 of the compass. In the embodiment illustrated in FIGS. 20A-20D, the first clinometer dial 58 is red and the second clinometer dial 60 is blue. However, other colors and/or symbols can be used to indicate the appropriate scale for the clinometer dials. For example, the first clinometer dial 58 can include a broken line and the second clinometer dial 60 can include a solid line to distinguish them and to indicate which scale to use when the lid is rotated around the minor axis. Although FIGS. 20A-20D indicate four possible orientations of the compass relative to planes being measured, the compass is not limited to these four orientations and it will be understood by one of skill in the art that other orientations and configurations of the compass are possible.

The direct contact method illustrated in FIG. 20 is an improvement over prior methods of measuring strike and dip because only one orientation of the compass 30 is necessary compared to the three compass orientations and separate measurements required when using compasses of prior designs. Further, this single compass orientation is more intuitive for those learning how to measure strike and dip because when the compass 30 is positioned as described above, the orientation of the compass lid 34 with respect to the base piece 32 provides a helpful visualization of strike and dip.

Figure 21:
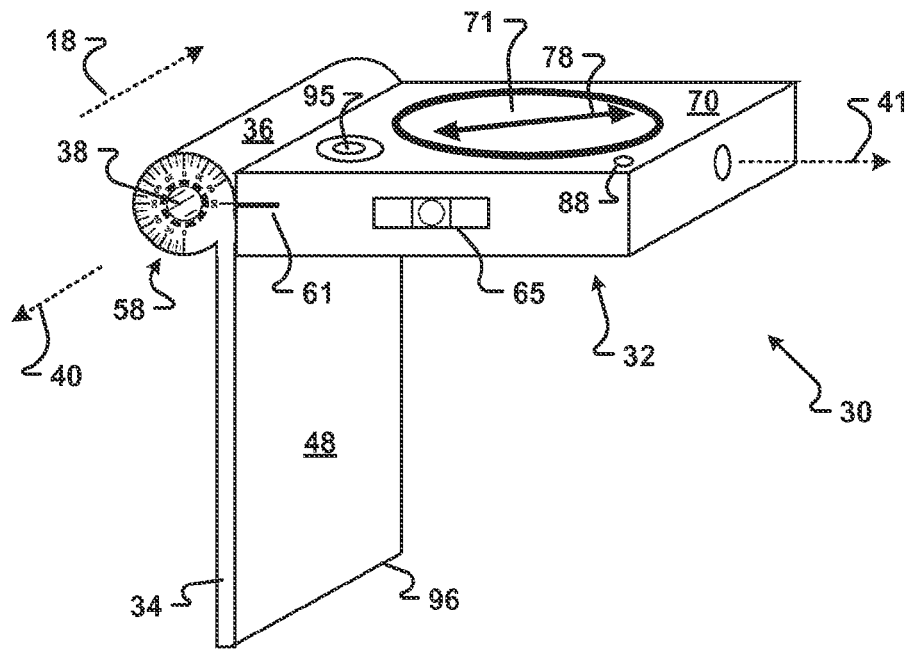
FIG. 21 illustrates a method of measuring bearings and vertical angles with a geologic compass of an embodiment of the present invention.

Referring now to FIG. 21, an embodiment of a method of measuring a bearing and a vertical angle is illustrated using a compass 30 of an embodiment of the present invention. The user moves to a position within a line-of-sight of the plane being measured. The compass face 70 is leveled using one or more of the side vial levels 65 or the bull's eye level 95. A bearing 18 along a level line (or a strike) is measured by sighting through the hollow sighting tube 38 through the hinge assembly 36. Once the object is sighted through the sighting tube, the compass needle 78 is locked by pressing and holding or pressing and releasing the needle lock actuator 88 to prevent further movement of the compass needle. The bearing (or strike) of the plane can then be recorded from the compass dial after the sighting tube 38 and compass 30 are moved away from the user's eye.

Dip angle can be simultaneously measured by moving the lid 34 to align with the angle of the plane. Dip angle can be read from the clinometer dials 58, 60 at either end of the sighting tube 38 on the left and right sides of the compass 30. Dip direction is recognized as either left or right of current viewpoint and stated in correct quadrangle. In the embodiment of the compass 30 of the present invention illustrated in FIG. 21, a single measure line 61 is adapted to indicate dip angle for each of the first and second clinometer dials 58, 60. For example, as illustrated in FIG. 21, the measure line 61 is proximate to "90" on the first clinometer dial 58 indicating the lid 34 is at an angle of approximately 90° with respect to the base piece 32.

Referring now to FIG. 22, a method of sighting an angle in the vertical plane to calculate the height of an object 29 or elevation is illustrated. The compass lid 34 is rotated around both the major 40 and minor axis 41. The object 29 is then sighted through the sighting tube 38. The clinometer needle 92 on the compass face 70 will then indicate the dip angle 10 on the clinometer dial 94. The needle lock actuator 88 can be pressed or released to engage the needle lock mechanism 87 to ensure the clinometer needle 92 does not move until the dip angle is recorded. In the embodiment of the compass 30 of the present invention illustrated in FIG. 22, the single measure line 61 is proximate to "0" on the second clinometer dial 60 indicating the lid 34 is in a fully open position at an angle of approximately 0° with respect to the base piece 32.

Figure 23A:
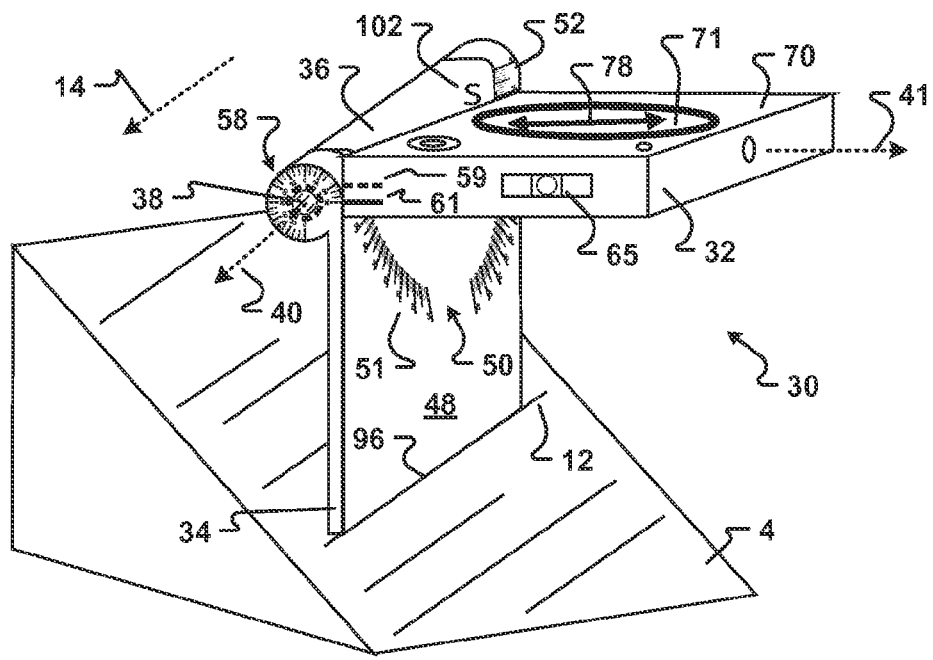
FIGS. 23A-23C illustrate the use of a geologic compass of the present invention to measure trend and plunge of three different geological structures according to a method of an embodiment of the present invention.
Figure 23B:
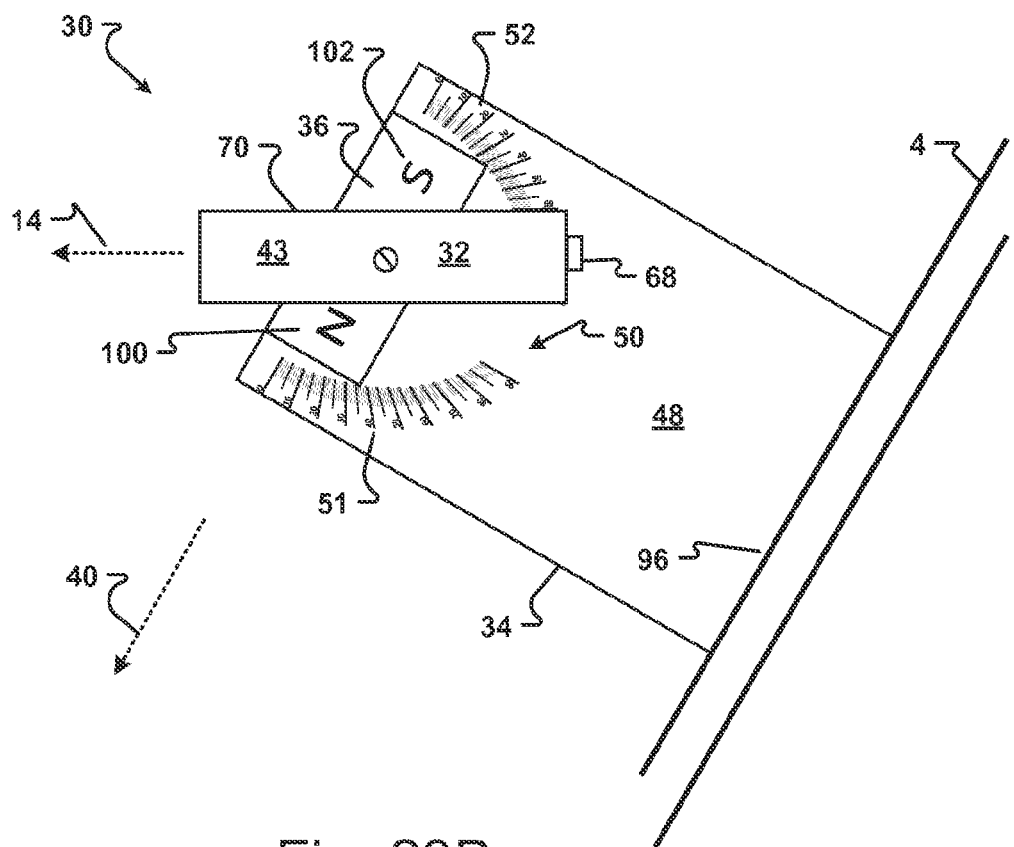

Referring now to FIG. 23A, a direct contact method of measuring trend and plunge of a lineation 12 with an embodiment of a compass 30 of the present invention is illustrated. As will be appreciated by one of skill in the art, lineations can include fault slickenlines, erosional grooves, current ripple marks, metamorphic crenulations, fold axes, and mineral alignments from flow banding or tectonic strain. The compass lid 34 is rotated around the major axis 40 until the lid is at approximately 90° relative to the compass base piece 32. A distal edge 96 of the lid 34 is positioned parallel with the trend bearing 14 of the lineation 12. A fold axis can also be measured by aligning the hollow hinge tube 38 with the fold axis. The base piece 32 is then rotated around the minor axis 41 of the compass until the compass face 70 is substantially level (or horizontal), which also creates a vertical plane out of the lid that is aligned with the lineation 12. The trend (or direction of plunge) is then recorded from the compass dial scale of the compass 71. Trend will be read from the North end 79 of the compass needle 78 if the lineation 12 plunges away from the user. In one embodiment of the present invention, the correct end of the compass needle 78 to read is indicated by North and South indicia 100, 102 or color code on the hinge assembly 36. Trend will be read from the South end 80 of the compass needle 78 if the lineation plunges towards the user. In one embodiment, as illustrated in FIG. 23A, the South pointer 80 is the correct end of the compass needle 78 to read when the lineation plunges towards the user as is indicated by the South indicia 102 or color code on the hinge assembly 36 visible above the compass face 70. Plunge angle of the lineation 12 is then indicated where the compass face 70 intersects the protractor dial scale 50 on the exterior surface portion 48 of the lid 34. In the example illustrated in FIG. 23A, the plunge angle is approximately 10° as indicated by the position of intersection of the compass base 32 with the second protractor scale 52. Referring now to FIG. 23B, another example of the direct contact method is illustrated. The plunge angle indicated on the second protractor scale 52 of the lid 34 by the base piece 32 is approximately 60°.

Figure 23C:
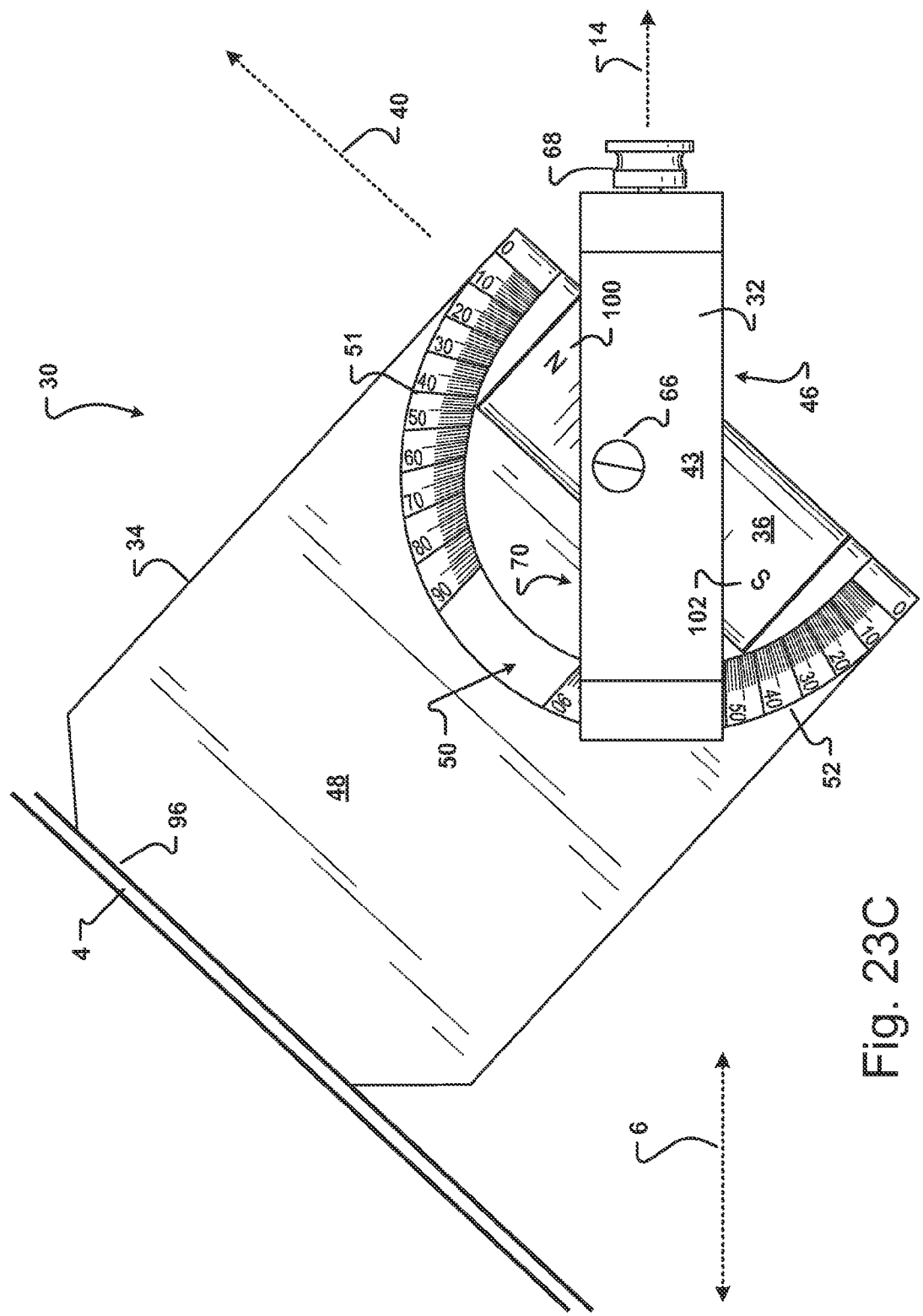

Because the lid 34 and hinge assembly 36 of the compass 30 of the present invention can rotate around both the minor axis 41 and the major axis 40, the compass can measure lineations in all possible arrangements, including overhanging and steep faces. Referring now to FIG. 23C, lineations can also be measured on overhanging surfaces 4 by rotating the lid 34 180° around the minor axis 41 (which projects perpendicular to the surface of FIG. 23C). The base piece 32 is then leveled to be substantially aligned with the horizontal plane 6. Optionally, as previously described, a level, such as a bull's-eye level 95, may be positioned in the back portion 46 of the base piece 32, to help the user level the base piece when the compass 30 is used to measure an overhanging lineation in this configuration. Trend is read from the compass face 70 as described above. Plunge is read from the protractor dial 50 on the lid 34, beneath the compass base piece 32 where the back portion 46 of the compass intersects the protractor dial 50 instead of above the face portion 70 as described previously. Said another way, the plunge angle of the lineation is read from the portion 52 of the protractor dial 50 on the lid 34 that is below the base piece 32. In the embodiment of the compass 30 illustrated in FIG. 23C, the plunge angle of the lineation on the overhanging surface 4 is approximately 50° as indicated by the back portion 46 of the base piece 32 proximate to "50" on the second protractor scale 52.

The compass 30 of the present invention only requires a single compass orientation to measure trend and plunge without requiring the use of a second object to extend the vertical plane. This is an improvement over the direct contact method of measuring trend and plunge with known compasses that require two different compass orientations and holding a second object along the lineation. The compass of the present invention also provides a more intuitive method of measuring trend and plunge and enables simpler measurements of awkward planes created by overhangs and near-vertical surfaces.

The description of the present invention has been presented for purposes of illustration and description, but is not intended to be exhaustive or limiting of the invention to the form disclosed. Many modifications and variations will be apparent to those of ordinary skill in the art. The embodiments described and shown in the figures were chosen and described in order to best explain the principles of the invention, the practical application, and to enable those of ordinary skill in the art to understand the invention.

While various embodiments of the present invention have been described in detail, it is apparent that modifications and alterations of those embodiments will occur to those skilled in the art. Moreover, references made herein to "the present invention" or aspects thereof should be understood to mean certain embodiments of the present invention and should not necessarily be construed as limiting all embodiments to a particular description. It is to be expressly understood that such modifications and alterations are within the scope and spirit of the present invention, as set forth in the following claims.

What is claimed is:

1. A measuring device for measuring one or more of a geologic structure, a bearing, an angle, strike and dip of a plane, and trend and plunge of a line, comprising:
   a base piece including a compass;
   a hinge assembly interconnected to the base piece; and
   a lid piece rotatably interconnected to the hinge assembly, wherein the lid piece is operable to rotate around both a major axis which is oriented substantially parallel to a longitudinal axis of the hinge assembly and a minor axis which is oriented substantially perpendicular to the longitudinal axis of the hinge assembly such that an orientation of the lid piece with respect to the base piece is identified on a scale.

2. The measuring device of claim 1, wherein a North-South orientation of the compass is substantially parallel to a plane defined by the longitudinal axis of the hinge assembly.

3. The measuring device of claim 1, further comprising a clinometer positioned in the base piece, the clinometer comprising a clinometer needle and a clinometer dial.

4. The measuring device of claim 3, wherein the clinometer needle is at least one of gravity-driven and lockable.

5. The measuring device of claim 1, wherein the minor axis is in a plane defined by the base piece.

6. The measuring device of claim 1, further comprising a protractor dial on an exterior surface of the lid piece, the protractor dial operable to measure plunge angles.

7. The measuring device of claim 6, wherein a plunge angle is identified on the protractor dial by a portion of the base piece.

8. The measuring device of claim 1, wherein all exterior surfaces of the device are substantially linear without projections and are operable to be placed in contact with a lineation or a plane being measured.

9. The measuring device of claim 1, further comprising:
   a bore formed through the hinge assembly substantially parallel to the major axis; and
   a sight tube positioned in the bore of the hinge assembly, wherein the sight tube is operable to rotate around the minor axis.

10. The measuring device of claim 9, wherein the sight tube includes a lens comprising a predetermined magnification.

11. A geologic structure measuring device, comprising:
    a base piece comprising a magnetic compass and a clinometer;
    a hinge assembly operably engaged to the base piece, the hinge assembly comprising a body with a bore forming a sight tube through the hinge assembly, the sight tube operable to align the base piece with an object; and
    a lid piece rotatably interconnected to the hinge assembly, wherein the lid piece is operable to rotate around a major axis of the compass.

12. The measuring device of claim 11, further comprising at least one of a first clinometer dial positioned around a circumference of a first end of the sight tube and a second clinometer dial positioned around a circumference of a second end of the sight tube, wherein the first and second clinometer dials are oriented to measure an angle of the lid piece with respect to the base piece.

13. The measuring device of claim 11, further comprising a lens in the sight tube.

14. The measuring device of claim 11, wherein the hinge assembly is rotatably interconnected to the base piece, and wherein the lid piece is operable to rotate around both the major axis and a minor axis that is substantially perpendicular to the major axis.

15. The measuring device of claim 14, further comprising a protractor dial on an exterior surface of the lid piece, wherein a plunge angle is identified on the protractor dial by a portion of the base piece.

16. The measuring device of claim 14, further comprising:
    a first indicia positioned on the hinge assembly, the first indicia associated with a North pointer of a needle of the magnetic compass; and
    a second indicia positioned on the hinge assembly, the second indicia associated with a South pointer of the needle of the magnetic compass.

17. The device of claim 15, further comprising an electronic display operable to display one or more of a bearing of the magnetic compass, an inclination of the clinometer, and a plunge angle of the protractor dial.

18. A method of measuring trend and plunge of a lineation of a geologic structure, comprising:
    providing a device having a base piece with a compass, a hinge assembly rotatably interconnected to the base piece, and a lid piece rotatably interconnected to the hinge assembly;
    rotating the lid piece around a major axis of the hinge assembly;
    aligning a portion of the device with the geologic lineation; and
    leveling the base piece of the device by rotating the base piece around a minor axis of the hinge assembly.

19. The method of claim 18, wherein aligning a portion of the device with the geologic lineation comprises one of positioning a distal edge of the lid piece substantially parallel with a trend bearing of the geologic lineation and aligning the hinge assembly with the geologic lineation.

20. The method of claim 18, further comprising:
    using a North pointer of a needle of the compass to determine trend bearing when a first indicia of the hinge assembly is visible; and
    using a South pointer of the needle of the compass to determine trend bearing when a second indicia of the hinge assembly is visible.

* * * * *